United States Patent
Wong et al.

(10) Patent No.: US 12,198,465 B2
(45) Date of Patent: Jan. 14, 2025

(54) METHODS AND SYSTEMS OF LOW POWER FACIAL RECOGNITION

(71) Applicant: SONY SEMICONDUCTOR SOLUTIONS CORPORATION, Kanagawa (JP)

(72) Inventors: Ping Wah Wong, Sunnyvale, CA (US); Kevin Chan, Milpitas, CA (US); Sa Xiao, San Jose, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/782,828

(22) PCT Filed: Dec. 4, 2020

(86) PCT No.: PCT/JP2020/045297
§ 371 (c)(1),
(2) Date: Jun. 6, 2022

(87) PCT Pub. No.: WO2021/117639
PCT Pub. Date: Jun. 17, 2021

(65) Prior Publication Data
US 2023/0007208 A1    Jan. 5, 2023

Related U.S. Application Data

(63) Continuation of application No. 16/859,943, filed on Apr. 27, 2020, now abandoned.
(Continued)

(51) Int. Cl.
*G06V 40/16* (2022.01)
*G06V 10/147* (2022.01)
(Continued)

(52) U.S. Cl.
CPC .......... *G06V 40/166* (2022.01); *G06V 10/147* (2022.01); *H04N 23/611* (2023.01);
(Continued)

(58) Field of Classification Search
CPC .. G06V 10/147; G06V 40/166; H04N 23/611; H04N 23/65; H04N 25/53;
(Continued)

(56) References Cited

U.S. PATENT DOCUMENTS 5,159,642 A   10/1992  Kosaka
6,674,837 B1   1/2004  Taskar et al.
(Continued)

FOREIGN PATENT DOCUMENTS

CN   103533263 A   1/2014
EP   3425898       1/2019
(Continued)

OTHER PUBLICATIONS

Medathati et al., "Bio-inspired computer vision: Towards a synergistic approach," Computer Vision and Image Understanding, vol. 150, Apr. 29, 2016, pp. 1-30.
(Continued)

*Primary Examiner* — Antoinette T Spinks
(74) *Attorney, Agent, or Firm* — SHERIDAN ROSS P.C.

(57) ABSTRACT

An image sensor comprises a plurality of pixels. Pixels are capable of detecting a change in an amount of light intensity and pixels are capable of detecting an amount of light intensity. In a first mode the sensor outputs data from the first one or more of the pixels. In a second mode the sensor outputs data from the second one or more of the pixels. The first mode may be a lower power operation mode and the second mode may be a higher power operation mode. At least one of the first mode and the second mode is selected by a processor based on at least one of a result of processing
(Continued)

data output in the first mode and a result of processing data output in the second mode.

20 Claims, 16 Drawing Sheets

Related U.S. Application Data

(60) Provisional application No. 62/947,893, filed on Dec. 13, 2019.

(51) Int. Cl.
    *H04N 23/611*   (2023.01)
    *H04N 23/65*    (2023.01)
    *H04N 25/53*    (2023.01)
    *H04N 25/77*    (2023.01)
    *H04N 25/79*    (2023.01)

(52) U.S. Cl.
    CPC ............. *H04N 23/65* (2023.01); *H04N 25/53* (2023.01); *H04N 25/77* (2023.01); *H04N 25/79* (2023.01)

(58) Field of Classification Search
    CPC ........ H04N 25/77; H04N 25/79; H04N 25/00; H04N 25/47
    See application file for complete search history.

(56) References Cited

U.S. PATENT DOCUMENTS

| | | | |
|---|---|---|---|
| 10,097,804 | B2 | 10/2018 | Sato et al. |
| 10,345,447 | B1 * | 7/2019 | Hicks .................. G01S 7/4863 |
| 10,999,524 | B1 | 5/2021 | Duelli et al. |
| 2006/0140445 | A1 | 6/2006 | Cusack, Jr. |
| 2007/0109433 | A1 | 5/2007 | Yamada et al. |
| 2009/0040356 | A1 | 2/2009 | Shih et al. |
| 2009/0066782 | A1 | 3/2009 | Choi et al. |
| 2010/0231738 | A1 | 9/2010 | Border et al. |
| 2011/0025900 | A1 | 2/2011 | Kondo |
| 2012/0057029 | A1 | 3/2012 | Border et al. |
| 2013/0123015 | A1 | 5/2013 | Jung et al. |
| 2014/0009648 | A1 | 1/2014 | Kim et al. |
| 2014/0111423 | A1 | 4/2014 | Park et al. |
| 2014/0368712 | A1 | 12/2014 | Park et al. |
| 2015/0229889 | A1 | 8/2015 | Boettiger |
| 2015/0317304 | A1 | 11/2015 | An et al. |
| 2016/0037110 | A1 | 2/2016 | Choi et al. |
| 2016/0119522 | A1 | 4/2016 | Choi et al. |
| 2017/0011525 | A1 | 1/2017 | Kim et al. |
| 2017/0132794 | A1 | 5/2017 | Lee et al. |
| 2018/0137647 | A1 | 5/2018 | Li et al. |
| 2018/0167575 | A1 | 6/2018 | Watanabe et al. |
| 2018/0173948 | A1 | 6/2018 | Gousev et al. |
| 2018/0342081 | A1 | 11/2018 | Kim et al. |
| 2019/0007678 | A1 | 1/2019 | Perez-Ramirez et al. |
| 2019/0007690 | A1 | 1/2019 | Varadarajan et al. |
| 2019/0037156 | A1 | 1/2019 | Mikami |
| 2019/0096081 | A1 | 3/2019 | Gupta et al. |
| 2019/0207931 | A1 | 7/2019 | Alameh et al. |
| 2019/0213309 | A1 | 7/2019 | Morestin et al. |
| 2019/0325269 | A1 | 10/2019 | Bagherinezhad et al. |
| 2019/0355169 | A1 | 11/2019 | Sapienza et al. |
| 2019/0356849 | A1 | 11/2019 | Sapienza et al. |
| 2020/0005613 | A1 | 1/2020 | Yuan et al. |
| 2020/0084403 | A1 | 3/2020 | Suh et al. |
| 2020/0105111 | A1 | 4/2020 | Messer et al. |
| 2020/0106772 | A1 | 4/2020 | Alameh et al. |
| 2020/0117952 | A1 | 4/2020 | Carroll et al. |
| 2020/0342303 | A1 | 10/2020 | Stent |
| 2020/0404177 | A1 | 12/2020 | Sapienza et al. |
| 2021/0105421 | A1 | 4/2021 | Kukreja et al. |
| 2021/0185264 | A1 | 6/2021 | Wong et al. |
| 2021/0185265 | A1 | 6/2021 | Wong et al. |
| 2021/0185266 | A1 | 6/2021 | Chan et al. |
| 2021/0185284 | A1 | 6/2021 | Chan et al. |

FOREIGN PATENT DOCUMENTS

| | | |
|---|---|---|
| EP | 3800580 | 4/2021 |
| KR | 101951361 | 2/2019 |

OTHER PUBLICATIONS

International Search Report and Written Opinion for International (PCT) Patent Application No. PCT/JP2020/045297, dated Feb. 25, 2021, 5 pages.
International Search Report and Written Opinion for International (PCT) Patent Application No. PCT/JP2020/045310, dated Apr. 26, 2021, 19 pages.
International Search Report and Written Opinion for International (PCT) Patent Application No. PCT/JP2020/045466, dated May 7, 2021, 19 pages.
International Search Report and Written Opinion for International (PCT) Patent Application No. PCT/JP2020/045468, dated Feb. 23, 2021, 10 pages.
Official Action for U.S. Appl. No. 16/859,928, dated May 10, 2021, 14 pages.
Corrected Official Action for U.S. Appl. No. 16/859,928, dated May 11, 2021, 15 pages.
Official Action for U.S. Appl. No. 16/859,928, dated Sep. 23, 2021, 15 pages.
Official Action for U.S. Appl. No. 16/859,928, dated Feb. 4, 2022, 13 pages.
Official Action for U.S. Appl. No. 16/859,882, dated Aug. 4, 2021, 16 pages.
Official Action for U.S. Appl. No. 16/859,882, dated Dec. 13, 2021, 18 pages.
Notice of Allowance for U.S. Appl. No. 16/859,882, dated Mar. 4, 2022, 10 pages.
Official Action for U.S. Appl. No. 16/859,943, dated Apr. 1, 2021, 10 pages.
Official Action for U.S. Appl. No. 16/859,943, dated Sep. 17, 2021, 11 pages.
Official Action for U.S. Appl. No. 16/859,943, dated Feb. 7, 2022, 13 pages.
Official Action for U.S. Appl. No. 16/859,905, dated Jan. 29, 2021, 6 pages. Restriction Requirement.
Official Action for U.S. Appl. No. 16/859,905, dated Mar. 29, 2021, 15 pages.
Official Action for U.S. Appl. No. 16/859,905, dated Sep. 17, 2021, 15 pages.
Official Action for U.S. Appl. No. 16/859,905, dated Feb. 4, 2022, 17 pages.
International Search Report prepared by the European Patent Office on Feb. 16, 2021, for International Application No. PCT/JP2020/045297, 4 pgs.
Written Opinion prepared by the European Patent Office on Feb. 16, 2021, for International Application No. PCT/JP2020/045297, 5 pgs.
Official Action for U.S. Appl. No. 16/859,928, dated Aug. 3, 2022, 15 pages.
Official Action for U.S. Appl. No. 17/782,832, dated Jan. 31, 2023, 18 pages.
Official Action for U.S. Appl. No. 17/782,832, dated Jun. 13, 2023, 20 pages.
Official Action for U.S. Appl. No. 16/859,943, dated Sep. 12, 2022, 11 pages.
Official Action for U.S. Appl. No. 16/859,905, dated Aug. 11, 2022, 19 pages.
Official Action for U.S. Appl. No. 17/782,822, dated Apr. 26, 2024, 12 pages.
Official Action for U.S. Appl. No. 17/782,822, dated Aug. 31, 2023, 13 pages.

(56) References Cited

OTHER PUBLICATIONS

Official Action for U.S. Appl. No. 17/782,822, dated Jan. 25, 2024, 15 pages.
Notice of Allowance for U.S. Appl. No. 17/782,832, dated Sep. 14, 2023, 9 pages.

* cited by examiner

METHODS AND SYSTEMS OF LOW POWER FACIAL RECOGNITION

CROSS REFERENCE TO RELATED APPLICATIONS

This application is a national stage application under 35 U.S.C. 371 and claims the benefit of PCT Application No. PCT/JP2020/045297, having an international filing date of 4 Dec. 2020, which designated the United States, which PCT application claimed the benefit of U.S. application Ser. Nos. 16/859,943, filed 27 Apr. 2020, and 62/947,893, filed 13 Dec. 2019, the entire disclosures of each of which are incorporated herein by reference.

TECHNICAL FIELD

The present disclosure relates to cameras with event based sensor and image sensor capabilities, and to dynamically switch between event based sensors and RGB sensors for low power facial recognition.

BACKGROUND

In the related art, RGB sensors are used to generate image data to capture details of a scene. RGB sensors provide imagery which may be used in a number of applications from security to sporting events. RGB sensors, however, may require high rates of power consumption which render the use of RGB sensors in many applications infeasible or undesirable. For example, in some applications a camera may be desired to record video and/or still image data relating to an event. If the event occurs infrequently or if the timing of the event is unknown or not easily predicted, the RGB camera may need to be kept constantly operating at a high frame rate which may make the use of an RGB camera or sensor impractical due to the high rate of power consumption. As a result, to record image data of such an event would, using conventional methods, require a great deal of power.

RGB sensor or cameras are highly valuable assets in the application of facial recognition systems. RGB sensors or cameras with RGB sensors may be used to record images or videos of a scene. RGB data from the sensors or cameras may be analyzed and used to identify one or more faces from the image data. RGB sensors or cameras, however, require a great deal of power as compared to other types of sensors. As such, using a camera system to constantly record and analyze images to recognize facial data requires a high amount of power.

What is needed is an image-capturing system capable of capturing image data relating to an event without requiring an excessive amount of power consumption.

SUMMARY

Technical Problem

A camera with a combination of event based sensor ("EBS") and RGB sensing capabilities in which the operation of the imaging, or RGB, functions is triggered in response to the detection of an event can overcome some of the limitations of using a regular imaging type device, or RGB sensor, alone to reliably detect events while providing efficient operation. By intelligently using EBS data collected in an EBS operating mode to detect the occurrence of an event or to detect a scenario in which imaging data is desired, the high-power consumption RGB mode may be activated or deactivated only as needed.

As compared to RGB sensors, EBS sensors provide a benefit of lower power operation. EBS sensors are capable of providing high speed object detection while operating in low power. RGB sensors provide for high accuracy color image and/or video while operating at relatively high power compared to EBS sensors. As disclosed herein, when a triggering event is registered based on information received from an EBS sensor, an RGB sensor may be activated. A triggering event may be a detection of an object or a particular type of object in EBS data. RGB mode may be switched to when a triggering event occurs while in an EBS mode. For example, a sensor or camera system in EBS mode may be used to detect a face in one or more EBS frames. The sensor or camera system may be switched to RGB mode to implement a process of facial recognition using image data from the RGB mode.

In some embodiments, a triggering event may be based on data from the EBS sensor being analyzed by a neural network. In some embodiments, a triggering event may be based on EBS event tracking by a recurrent neural network. For example, the EBS data may be fed to a neural network and may trigger an RGB mode when a set of desired object categories, such as a face, is detected.

Therefore, the present disclosure provides cameras, sensor systems, devices, and methods that are capable of providing both imaging and object detection and recognition functions with improved image sensor efficiency and effectiveness as compared to other configurations.

Solution to Problem

In accordance with embodiments and aspects of the present disclosure, there is provided a camera or a sensor system having EBS and image sensor (e.g. red, green, blue ("RGB") image sensor) capabilities or functions. The EBS and image sensor capabilities may be provided by separate EBS and imaging sensor devices. The EBS and image sensing capabilities may also be implemented by a sensor device having combined EBS and imaging sensing capabilities. A sensor device having combined EBS and imaging sensing capabilities can include a sensor device with an array of pixels that includes both EBS and image sensing pixels. Moreover, a combined EBS and image sensor can include photoelectric conversion regions that are provided as part of pixels that perform both EBS and image sensing functions. For ease of description, the discussion herein will refer to EBS and image sensor functions as being provided by separate EBS and image sensors, however, unless specifically stated otherwise, it should be understood that the EBS and image sensors can be integrated into a single sensor device that provides both the EBS and image sensor functions.

As disclosed herein, an event detected by a EBS sensor or by EBS capable pixels may trigger activation of an image sensor or pixels capable of image sensing such as RGB pixels. Moreover, in accordance with at least some embodiments of the present disclosure, activation of an image sensor includes activating the image sensor at a particular framerate. In accordance with at least some embodiments of the present disclosure, an event may comprise detection of an object.

In accordance with at least some embodiments and aspects of the present disclosure, object detection may be performed by a processor in communication with an EBS sensor or EBS capable sensor. The processor may execute a neural network or another type of analysis algorithm. For example, a processor may be capable of analyzing EBS sensor data and detecting an object that is determined to be moving relative to the EBS sensor and in response may be capable of activating or deactivating an RGB sensor or RGB capabilities of certain pixels. In accordance with further embodiments and aspects of the present disclosure, detection of an object that is travelling relatively quickly may result in the activation of an image sensor at a relatively high frame rate. The frame rate of the activated image sensor can also by varied based on characteristics of the object detected by the processor analyzing EBS sensor data. For instance, the image sensor can be operated at a relatively low frame rate where a detected object is moving slowly. The image sensor can be operated at a relatively high frame rate where a detected object is moving quickly.

In accordance with at least some embodiments of the present disclosure, the characteristics of an object detected by the EBS sensor can be analyzed in connection with determining the operating parameters of the image sensor. For instance, a neural network or other decision making facility can determine whether a detected event has been triggered by an object within a desired object category. If a desired object category has been detected, the frame rate of the image sensor may be adjusted based on characteristics of the object. The amount of time for which the image sensor will be activated may also depend on detected characteristics of a detected object. For instance, data from the EBS sensor can be analyzed, for example by a neural network or other decision making facility, to detect a type of object, a speed of the detected object, or other information which may be used to adjust settings for activation of the RGB mode of the sensor.

In general, it is desirable to discontinue operation of the image sensor after a desired condition has occurred and return to EBS sensor operation in order to conserve power. Embodiments and aspects of the present disclosure can discontinue operation of the image sensor and return the system to an EBS mode when certain conditions are satisfied. These can include after a determination is made that nothing of interest is occurring. For instance, imaging of an object can be discontinued, and the image sensor can be returned to sleep mode after an object that was previously moving has stopped. Image sensor operation can also be discontinued after an object has been identified, and it is determined that continued imaging of the identified object is not required or desired. As another example, image sensor operation can be discontinued after an object has moved out of the imaged scene. As still another example, image sensor operation can be discontinued after a predetermined period of time has elapsed. In accordance with embodiments of the present disclosure, EBS sensor operation may remain active continuously, whether or not image sensor operation is active.

The present disclosure can provide cameras, systems, or devices with event based sensing and imaging capabilities that are capable of improved power consumption, data transmission, and data processing efficiencies.

DESCRIPTION OF EMBODIMENTS

Figure 1:
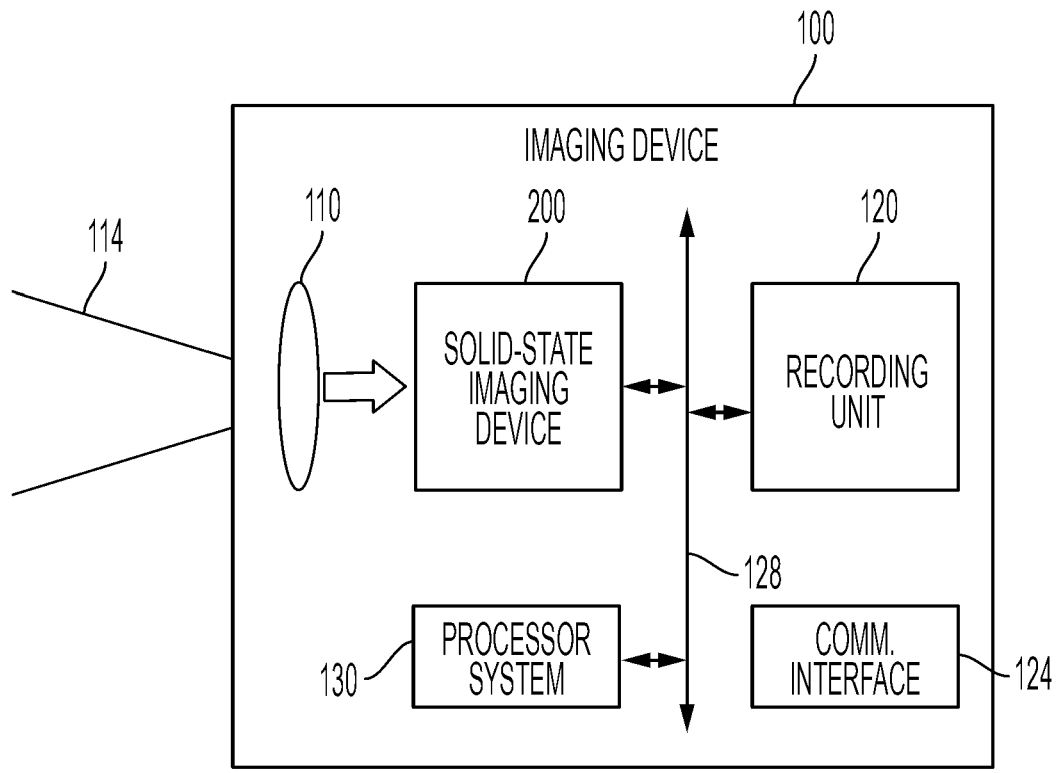
FIG. 1 is a block diagram illustrating a schematic configuration example of an image sensor in accordance with embodiments of the present disclosure.

Hereinafter, embodiments of the present disclosure will be described in detail on the basis of the accompanying drawings. Furthermore, in the following embodiments, the same reference numeral will be given to the same or equivalent portion or element, and redundant description thereof will be omitted.

A typical event based sensor (EBS) employs a so-called event-driven type driving method in which the existence or nonexistence of address event ignition is detected for every unit pixel, and a pixel signal and ignition time information are read out from a unit pixel in which the address event ignition is detected.

Furthermore, the unit pixel in this description represents a minimum unit of a pixel or unit pixel including one photoelectric conversion element (also referred to as "light-receiving element") and can correspond to each dot in image data that is read out from an image sensor as an example. In addition, the address event represents an event that occurs for every address that is allocable to each of a plurality of the unit pixels which are arranged in a two-dimensional lattice shape. An event detection sensor responds to a change in intensity without being confined to the boundary of the integration time within frames of a traditional image sensor. Intensity change is correlated with a change in photocurrent, and if this change exceeds a constant threshold value it could be detected as an event.

FIG. 1 is a block diagram illustrating a schematic configuration example of an imaging device according to at least some embodiments of the present disclosure. As illustrated in FIG. 1, for example, an imaging device 100 includes an imaging lens 110, a solid-state imaging device or image sensor 200, a recording unit 120, a communication interface 124, and a processor system or control system 130. The various components of the imaging device 100 may be interconnected to one another by a communications bus 128 or signal lines. As examples, the imaging device 100 can be provided as or as part of a camera that is mounted in an industrial robot, an in-vehicle camera, or as part of or in connection with other devices or instruments.

The imaging lens 110 can include an optical system that collects light from within a field of view 114. The collected or incident light is directed (e.g. condensed) onto a light-receiving surface of the image sensor 200. In particular, the imaging lens 110 can collect light from within a selected area of a scene by directing the field of view 114 to encompass that portion of the scene. The light-receiving surface is a surface of a substrate on which photoelectric conversion elements of pixels 310 included in the image sensor 200 are arranged. The image sensor 200 photoelectrically converts the incident light to generate image data. As discussed herein, the image sensor 200 can include different sets of photoelectric conversion elements disposed on the same or different substrates. Moreover, the image sensor 200 can include photoelectric conversion elements that perform single or multiple functions. These functions can include event detection and imaging functions. In addition, the image sensor 200 can execute predetermined signal processing such as noise removal and white balance adjustment with respect to the generated image data. A result obtained by the signal processing and a detection signal indicating the existence or nonexistence of an address event ignition and ignition time information can be output by the image sensor 200 to the processor system 130. A method of generating the detection signal indicating the existence or nonexistence of the address event ignition will be described later.

The recording system 120 is, for example, constituted by a flash memory, a dynamic random access memory (DRAM), a static random access memory (SRAM), or the like, and records data provided from the image sensor 200.

The processor system 130 is, for example, constituted by a central processing unit (CPU) and the like. For example, the processor system 130 can include one or more general purpose processors, controllers, field programmable gate arrays (FPGAs), graphical processing units (GPUs), application specific integrated circuits (ASIC), or combinations thereof. Moreover, the processor system 130 can execute application programming or routines, stored as software or firmware in memory or data storage included in or interconnected to the processor system 130 to perform various functions and methods as described herein. For example, the processor system 130 can process data output from the image sensor 200. For example, as described herein, the processor system 130 can process event detection signals output by the EBS sensor function or portion of the image sensor 200 and can control the imaging sensor function or portion of the solid-state imaging device, at least in part in response to the event detection signals. The processor system 130 can also control components of the imaging device 100 in addition to the image sensor 200, such as the operation of the recording unit 120, the communication interface 124, focusing and shutter operations that might be supported by the imaging lens 110, and the like. In accordance with further embodiments of the present disclosure, the processor system 130 can implement advanced processing capabilities, including but not limited to neural network and artificial intelligence capabilities and functions, as described herein.

Next, a configuration example of the image sensor 200 will be described in detail with reference to the accompanying drawings.

Figure 2:
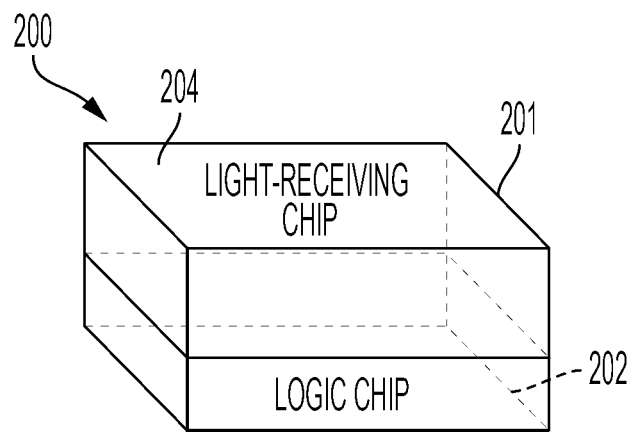
FIG. 2 is a view illustrating a lamination structure example of an image sensor according to in accordance with embodiments of the present disclosure.

FIG. 2 is a view illustrating a lamination structure example of an image sensor 200 in accordance with at least some embodiments of the present disclosure. As illustrated in FIG. 2, the image sensor 200 can have a structure in which a light-receiving chip 201 and a logic chip 202 are vertically laminated. A side of the light receiving chip 201 opposite the logic chip 202 is a light receiving surface 204. In joining of the light-receiving chip 201 and the logic chip 202, for example, so-called direct joining in which joining surfaces of the chips are planarized, and the chips are laminated with an inter-electron force can be used. However, there is no limitation thereto, and for example, so-called Cu—Cu joining in which copper (Cu) electrode pads formed on joining surfaces are bonded, bump joining, and the like can also be used.

In addition, the light-receiving chip 201 and the logic chip 202 are electrically connected to each other, for example, through a connection portion such as a through-silicon via (TSV) that penetrates through a semiconductor substrate. In the connection using the TSV, for example, a so-called twin TSV method in which two TSVs including a TSV that is formed in the light-receiving chip 201 and a TSV that is formed from the light-receiving chip 201 to the logic chip 202 are connected to each other on chip external surfaces, a so-called shared TSV method in which the light-receiving chip 201 and the logic chip 202 are connected with a TSV that penetrates through both the chips, and the like can be employed.

However, in the case of using the Cu—Cu joining or the bump joining in the joining of the light-receiving chip 201 and the logic chip 202, both the light-receiving chip 201 and the logic chip 202 are electrically connected to each other through a Cu—Cu joint or a bump joint.

As can be appreciated by one of skill in the art after consideration of the present disclosure, an imaging device 200 implemented as connected light receiving 201 and logic 202 chips can include image sensor 200 components disposed as part of the light receiving chip 201, with some or all of the processor system 130 components disposed as part of the logic chip 202. Other components, such as the recording unit 120 and communication interface components can be distributed amongst one or both of the chips 201 and 202. In accordance with still other embodiments, a data storage or other chip can be laminated and electrically connected to the light receiving 201 and logic 202 chips. Moreover, the light receiving chip can include multiple substrates joined to respective logic chips 202 or to a common logic chip 202, for example where the image sensor 200 includes multiple sensor devices.

Figure 3:
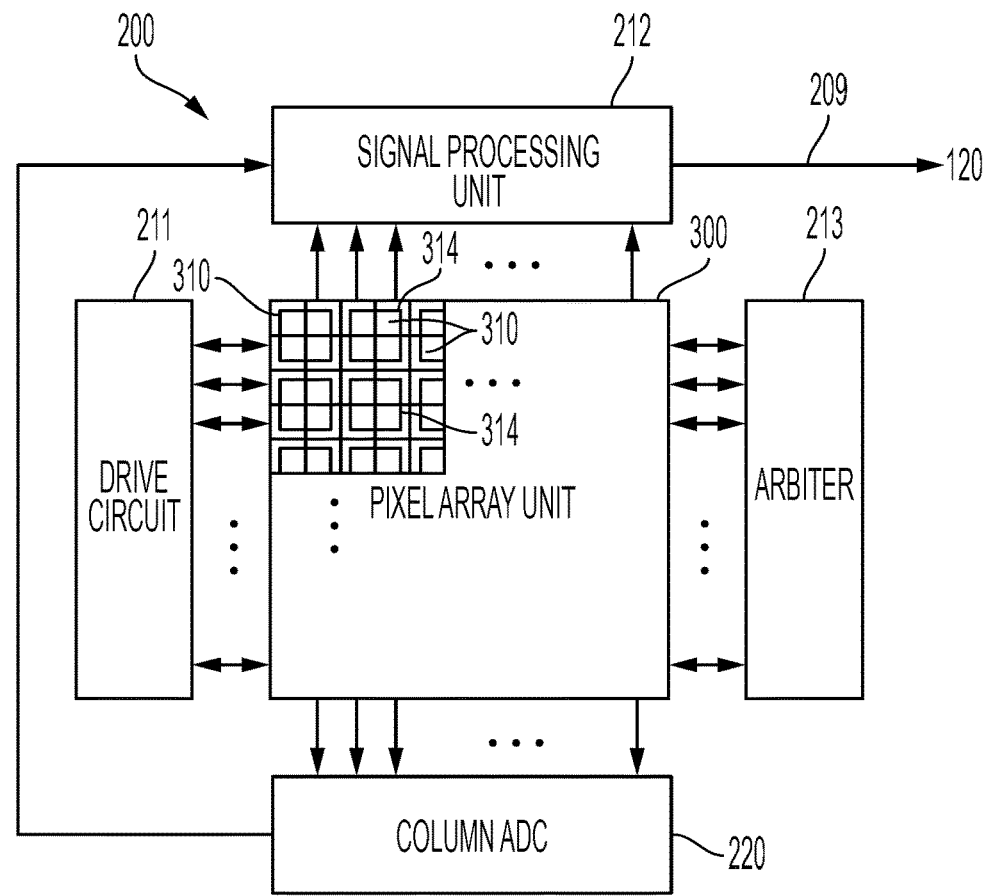
FIG. 3 is a block diagram illustrating a functional configuration example of an image sensor in accordance with embodiments of the present disclosure.

FIG. 3 is a block diagram illustrating a functional configuration example of the image sensor 200 according to at least some embodiments of the present disclosure. As illustrated in FIG. 3, the image sensor 200 can include a drive circuit 211, a signal processor 212, an arbiter 213, a column ADC 220, and a pixel array 300. Some or all of the components can be entirely or partially integrated into, or implemented by, the processor system 130.

A plurality of unit cells or pixels 310, also referred to herein simply as pixels 310, are arranged in the pixel array 300. Details of the unit pixels 310 will be described later. For example, each of the unit pixels 310 includes a photoelectric conversion element such as a photodiode, and a circuit that generates a pixel signal of a voltage value corresponding to the amount of charge generated in the photoelectric conversion element, hereinafter, referred to as a pixel circuit. Moreover, as discussed in greater detail elsewhere herein, the pixel circuit can include either or both of a first or imaging signal generation circuit and a second or address event detection readout circuit. Each photoelectric conversion element can be associated with a respective pixel circuit, or multiple photoelectric conversion elements can be associated with a common pixel circuit.

In this example, the plurality of unit pixels 310 are arranged in the pixel array 300 in a two-dimensional lattice shape. The plurality of unit pixels 310 may be grouped into a plurality of pixel blocks or groups, each including a predetermined number of unit pixels. Hereinafter, an assembly of unit pixels which are arranged in a horizontal direction is referred to as a "row," and an assembly of unit pixels which are arranged in a direction orthogonal to the row is referred to as a "column."

Each of the unit pixels 310 generates charges corresponding to an amount of light received at the respective photoelectric conversion element. In addition, at least some of the unit pixels 310 can be operated to detect the existence or nonexistence of address event ignition on the basis of whether or not a value of a current (hereinafter referred to as a photocurrent) produced by charges generated in the photoelectric conversion element or a variation amount thereof exceeds a predetermined threshold value. When the address event is ignited, a signal is output to the arbiter 213.

The arbiter 213 arbitrates requests received from the unit pixels 310 performing the event detection function and transmits a predetermined response to the unit pixel 310 which issues the request on the basis of the arbitration result. The unit pixel 310 which receives the response supplies a detection signal indicating the existence or nonexistence of the address event ignition (hereinafter, simply referred to as "address event detection signal") to the drive circuit 211 and the signal processor 212.

The drive circuit 211 drives each of the unit pixels 310 and allows each of the unit pixels 310 to output a pixel signal to the column ADC 220.

For every unit pixel 310 column, the column ADC 220 converts an analog pixel signal from the column into a digital signal. In addition, the column ADC 220 supplies a digital signal generated through the conversion to the signal processor 212.

The signal processor 212 executes predetermined signal processing such as correlated double sampling (CDS) processing (noise removal) and white balance adjustment with respect to the digital signal transmitted from the column ADC 220. In addition, the signal processor 212 supplies a signal processing result and an address event detection signal to the recording unit 120 through the signal line 209.

The unit pixels 310 within the pixel array unit 300 may be disposed in pixel groups 314. In the configuration illustrated in FIG. 3, for example, the pixel array unit 300 is constituted by pixel groups 314 that include an assembly of unit pixels 310 that receive wavelength components necessary to reconstruct color information from a scene. For example, in the case of reconstructing a color on the basis of three primary colors of RGB, in the pixel array unit 300, optical color filter materials can be deposited onto the pixels according to a predetermined color filter array to control light of desired wavelengths to reach the pixel surface. Specifically, a unit pixel 310 that receives light of a red (R) color, a unit pixel 310 that receives light of a green (G) color, and a unit pixel 310 that receives light of a blue (B) color are arranged in groups 314a according to the predetermined color filter array.

Examples of the color filter array configurations include various arrays or pixel groups such as a Bayer array of 2×2 pixels, a color filter array of 3×3 pixels which is employed in an X-Trans (registered trademark) CMOS sensor (hereinafter, also referred to as "X-Trans (registered trademark) type array"), a Quad Bayer array of 4×4 pixels (also referred to as "Quadra array"), and a color filter of 4×4 pixels in which a white RGB color filter is combined to the Bayer array (hereinafter, also referred to as "white RGB array"). In addition, and as discussed in greater detail elsewhere herein, event detection pixels can be interspersed or included within the pixel array 300. As also discussed in greater detail elsewhere herein, the event detection pixels may be provided as dedicated event detection pixels, which only perform an event detection function, or as combined event detection and image sensing pixels, which perform both event detection and image sensor functions.

Figure 4:
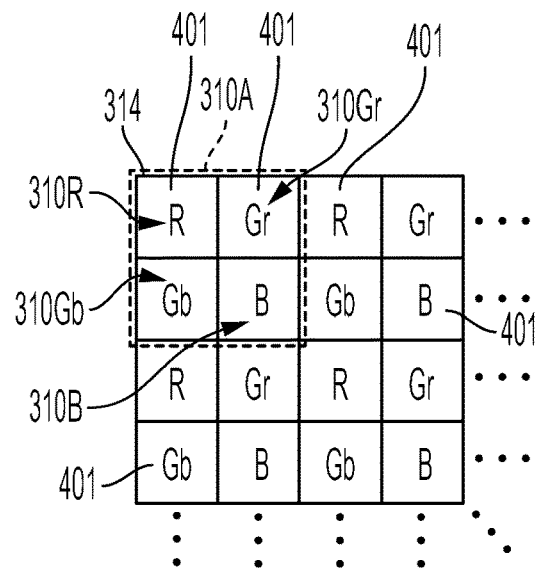
FIG. 4 is illustrates an array example of unit pixels in accordance with embodiments of the present disclosure in a case of employing a Bayer array in a color filter array.

FIG. 4 is a schematic view illustrating an array example of unit pixels 310 in the case of employing pixel groups 314 with an arrangement of unit pixels 310 and associated color filters in the color filter array configured to form a plurality of Bayer arrays 310A. As illustrated in FIG. 4, in the case of employing the Bayer array as the color filter array configuration, in the pixel array 300, a basic pattern 310A including a total of four unit pixels 310 of 2×2 pixels is repetitively arranged in a column direction and a row direction. For example, the basic pattern 310A is constituted by a unit pixel 310R including a color filter 401 of a red (R) color, a unit pixel 310Gr including a color filter 401 of a green (Gr) color, a unit pixel 310Gb including a color filter 401 of a green (Gb) color, and a unit pixel 310B including a color filter 401 of a blue (B) color.

Figure 5A:
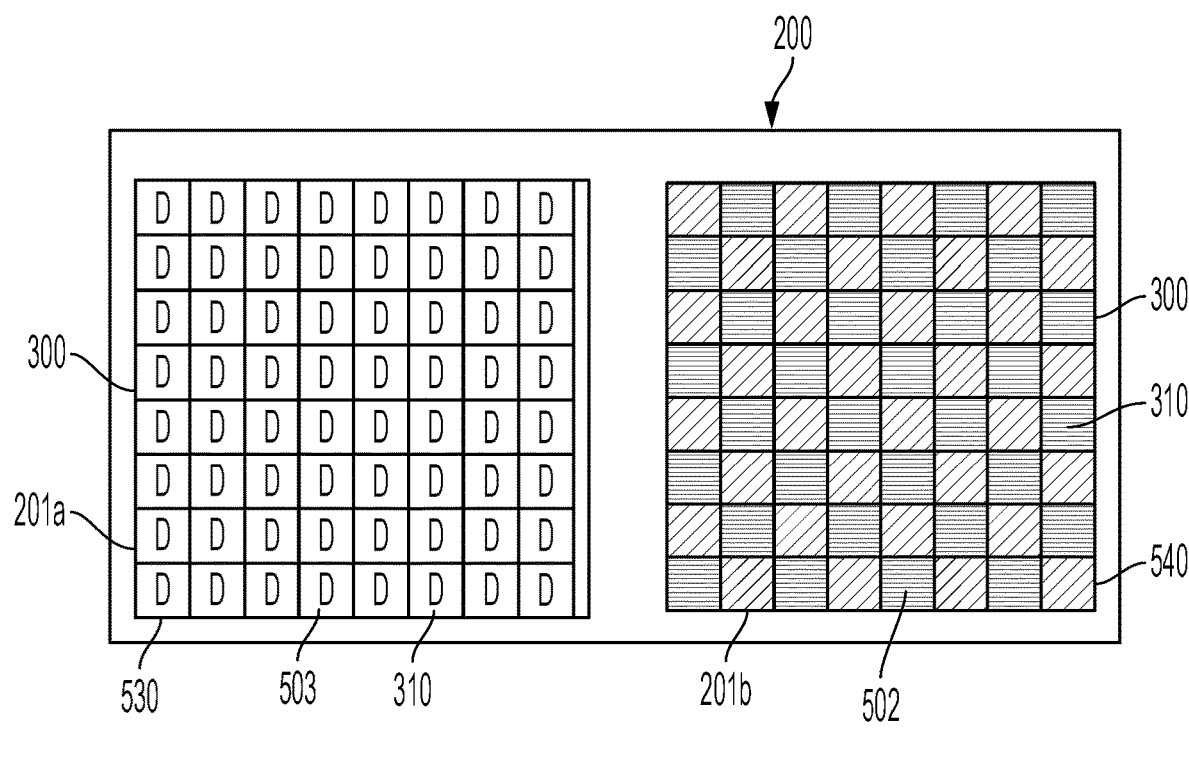
FIG. 5A illustrates aspects of an image sensor in accordance with embodiments of the present disclosure.

FIGS. 5A-5D depict various configuration examples of an imaging device 100, and in particular of arrangements of a solid-state imaging device or image sensor 200 pixels, in accordance with embodiments of the present disclosure. More particularly, FIG. 5A depicts an image sensor 200 having a first or EBS sensor 530, which includes an array 300 of pixels 310 in the form of address event detection pixels 503 disposed on a first light receiving chip or substrate 201a, and a second or imaging sensor 540, which includes an array 300 of pixels 310 in the form of image sensing pixels 502 disposed on a second light receiving chip or substrate 201b. As can be appreciated by one of skill in the art after consideration of the present disclosure, an imaging device 100 including separate EBS 530 and imaging 540 sensors can be configured with separate lens assemblies 110 that collect light from within the same or similar fields of view, or can be configured with a shared lens assembly 110 that directs light to the sensors 530 and 540 via a beam splitter. In accordance with embodiments of the present disclosure, the number of address event detection pixels 503 included in the EBS sensor 530 can be equal to the number of image sensing pixels 502 included in the imaging sensor 540. Moreover, the area of each address event detection pixel 503 can be the same as the area of each image sensing pixel 502. Alternatively, the EBS sensor 530 and the imaging sensor 540 can have different numbers of pixels 310. For example, the image sensor 200 can include a EBS sensor 530 having a relatively low number of event detection pixels 503, thereby providing a relatively low resolution, and an imaging sensor 540 having a relatively high number of image sensing pixels 502, thereby providing a relatively high resolution. In accordance with at least some embodiments of the present disclosure, event detection and image sensing operations can be performed simultaneously.

Figure 5B:
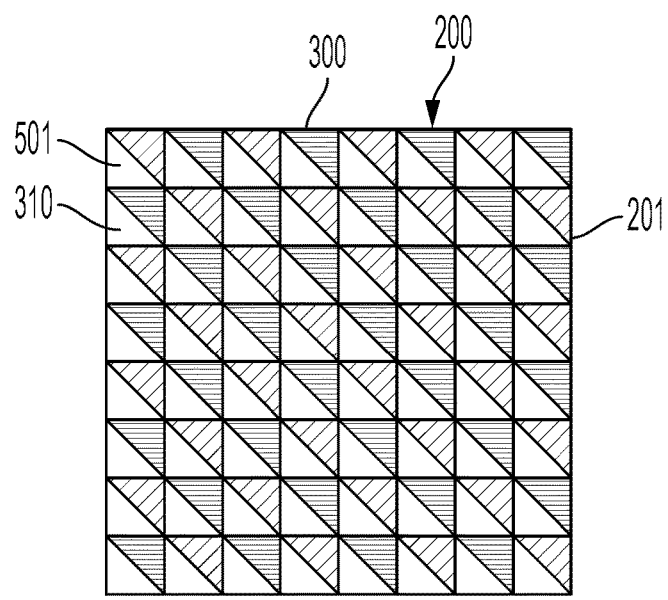
FIG. 5B illustrates aspects of an image sensor in accordance with other embodiments of the present disclosure.

FIG. 5B depicts image sensor 200 with pixels 310 configured as combined or shared event detection and image sensing pixels 501 disposed on a single light receiving chip or substrate 201. As can be appreciated by one of skill in the art after consideration of the present disclosure, the shared event detection and image sensing pixels 501 can be selectively operated in event detection or image sensing modes. Moreover, in accordance with at least some embodiments of the present disclosure, event detection and image sensing operations can be performed simultaneously with some pixels operating in event detection mode and some pixel operating in image sensing mode.

Figure 5C:
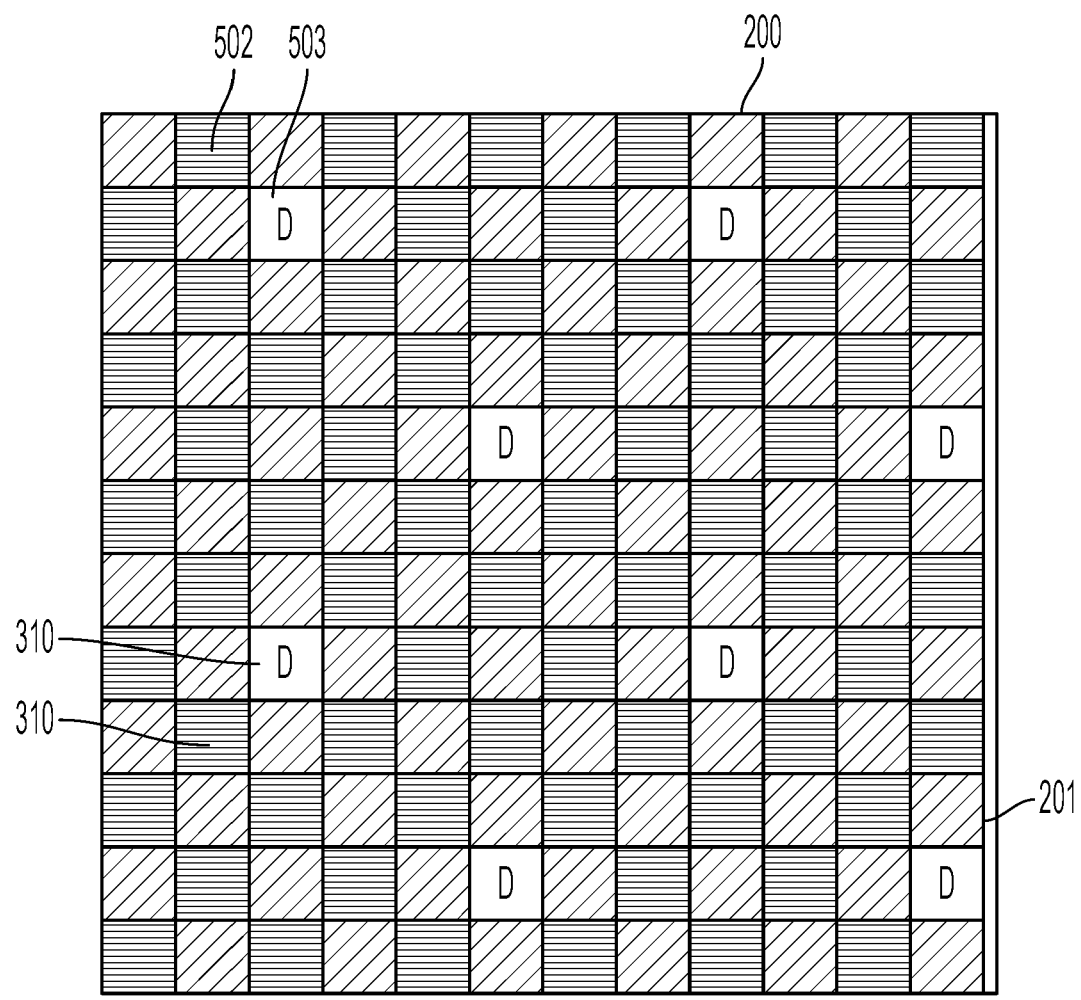
FIG. 5C illustrates aspects of an image sensor in accordance with other embodiments of the present disclosure.

FIG. 5C depicts image sensor 200 having an array of unit pixels 310 that includes a plurality of event detection pixels 503 and a plurality of image sensing pixels 502 formed on the same light receiving chip or substrate 201. In the illustrate example, the majority of the unit pixels are in the form of image sensing pixels 502, with a smaller number of event detection pixels 503 disposed amongst the image sensing pixels 502. However, an image sensor 200 having both event detection 503 and image sensing 502 pixels disposed on the same light receiving chip or substrate 201 can include the same number of pixels 502 and 503 or can have more event detection pixels 503 than image sensing pixels 502. In accordance with at least some embodiments of the present disclosure, event detection and image sensing operations can be performed simultaneously.

Figure 5D:
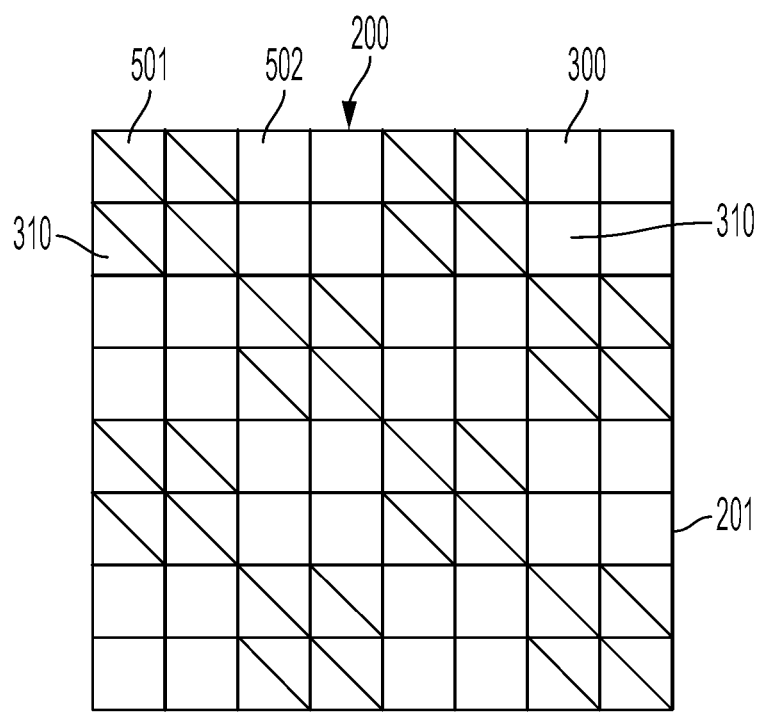
FIG. 5D illustrates aspects of an image sensor in accordance with other embodiments of the present disclosure.

FIG. 5D depicts an image sensor 200 having an array of unit pixels 310 that includes groups of shared event detection and image sensing pixels 501, and groups of image sensing pixels 502, formed on the same light receiving chip or substrate 201. The individual groups can be configured as Bayer arrays that alternate between Bayer array groups of shared event detection and image sensing pixels 501, and Bayer array groups of image sensing pixels 502. Accordingly, FIG. 5D is an example of an image sensor 200 in which different shared event detection and image sensing pixels 501 can respond to light within different wavelength ranges. For example, the shared event detection and image sensing pixels 501 can be associated with color filters. Alternatively, the shared pixels 501 can all receive light within the same wavelength range. Although an equal number of groups containing equal numbers of respective pixels 310 are depicted in the figure, other configurations are possible. As can be appreciated by one of skill in the art after consideration of the present disclosure, the shared event detection and image sensing pixels 501 can be selectively operated in event detection or image sensing modes. Moreover, in accordance with at least some embodiments of the present disclosure, event detection and image sensing operations can be performed simultaneously.

Figure 5E:
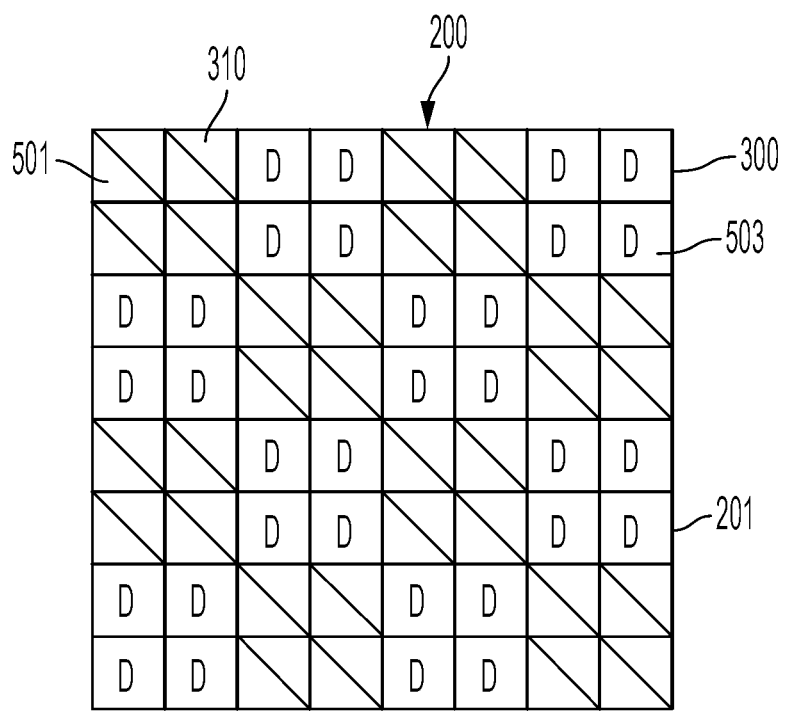
FIG. 5E illustrates aspects of an image sensor in accordance with other embodiments of the present disclosure.

FIG. 5E depicts an image sensor 200 having an array of unit pixels 310 that includes groups of shared event detection and image sensing pixels 501, and groups of event detection pixels 503, formed on the same light receiving chip or substrate 201. The individual groups of shared event detection and image sensing pixels can be configured as Bayer arrays that alternate with groups of event detection pixels 503. Although an equal number of groups containing equal numbers of respective pixels 310 are depicted in the figure, other configurations are possible. As can be appreciated by one of skill in the art after consideration of the present disclosure, the shared event detection and image sensing pixels 501 can be selectively operated in event detection or image sensing modes. Moreover, in accordance with at least some embodiments of the present disclosure, event detection and image sensing operations can be performed simultaneously.

Figure 5F:
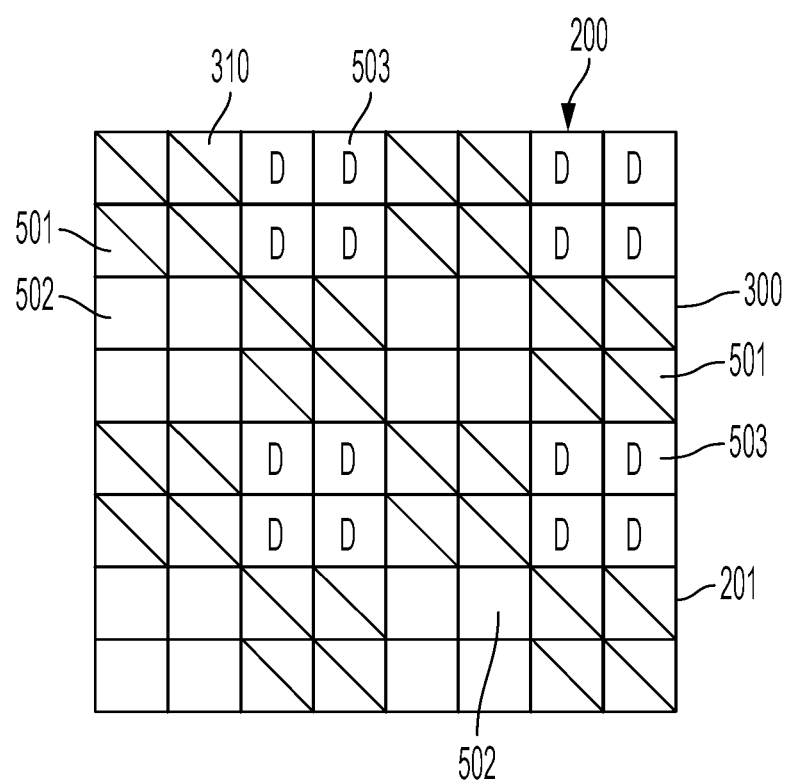
FIG. 5F illustrates aspects of an image sensor in accordance with other embodiments of the present disclosure.

FIG. 5F depicts an image sensor 200 having an array of unit pixels 310 that includes groups of shared event detection and image sensing pixels 501, groups of image sensing pixels 502, and groups of event detection pixels 503, all formed on the same light receiving chip or substrate 201. Some or all of the individual groups of pixels can be configured as Bayer arrays. For instance, in at least one example configuration, groups of shared event detection and image sensing pixels 501 and groups of image sensing pixels can be configured as Bayer arrays, while each of the event detection pixels 503 can be configured to receive light from within the same wavelength range. For example, the shared event detection and image sensing pixels 501 and the image sensing pixels can be associated with color filters, and the event detection pixels 503 can be without color filters. Although an arrangement in which ½ of the pixels 310 are shared event detection and image sensing pixels 501, ¼ of the pixels 310 are image sensing pixels 502, and ¼ of the pixels 310 are event detection pixels 503, other configurations are possible. As can be appreciated by one of skill in the art after consideration of the present disclosure, the shared event detection and image sensing pixels 501 can be selectively operated in event detection or image sensing modes. Moreover, in accordance with at least some embodiments of the present disclosure, event detection and image sensing operations can be performed simultaneously.

Figure 6A:
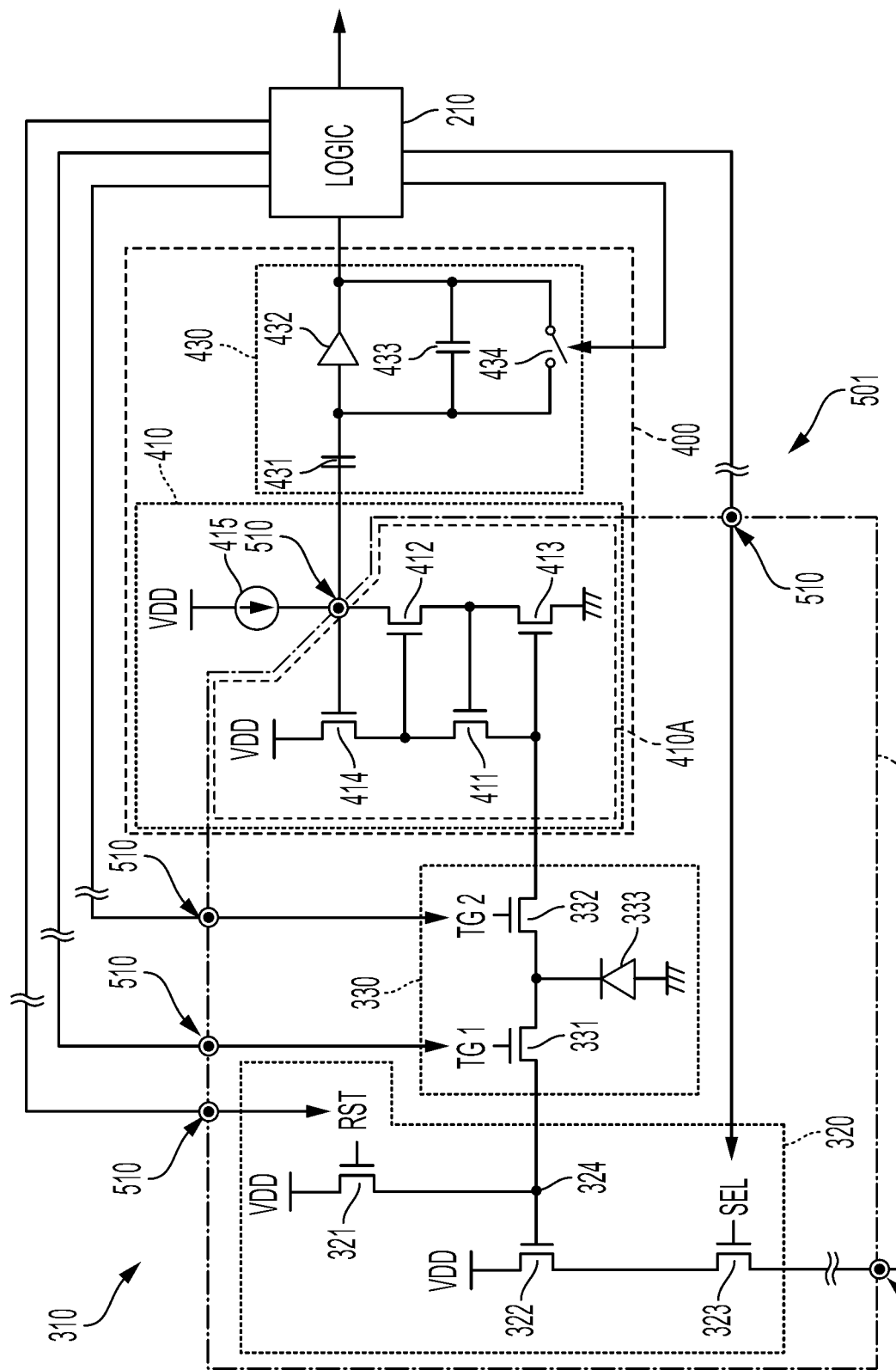
FIG. 6A is a circuit diagram illustrating a schematic configuration example of a unit pixel with combined event detection and image sensor functions in accordance with embodiments of the present disclosure.

Next, a configuration example of a unit pixel 310 will be described. FIG. 6A is a circuit diagram illustrating a schematic configuration example of the unit pixel 310 according to at least some embodiments of the present disclosure, and in particular in accordance with embodiments that include pixels 310 configured as combined or shared event detection (EBS) and image sensor (IS) pixels 501 that perform both event detection and image sensor functions. As illustrated in FIG. 6A, the unit pixel 310 includes, for example, a pixel imaging signal generation unit (or readout circuit) 320, a light-receiving unit 330, and an address event detection unit (or readout circuit) 400. According to at least one example embodiment, the event detection readout circuit 400 can trigger operation of the image signal generation readout circuit 320 based on charge generated by a photoelectric conversion element (or photoelectric conversion region) 333 and based on operation of the logic circuit 210. The logic circuit 210 in FIG. 6A is a logic circuit including, for example, the drive circuit 211, the signal processor 212, and the arbiter 213 in FIG. 3. In accordance with at least some embodiments of the present disclosure, the logic circuit can be implemented in the processor system 130. As described in greater detail elsewhere herein, the logic circuit 210 can make determinations as to whether to trigger operation of the image signal generation readout circuit 320 or the operation of image signal generation circuits 320 associated with other unit pixels 310 based on the output of the event detection readout circuit 400 or the output of other event detection readout circuits 400.

For example, the light-receiving unit 330 includes a first or imaging transmission transistor or gate (first transistor) 331, a second or address event detection transmission transistor or gate (second transistor) 332, and a photoelectric conversion element 333. A first transmission or control signal TG1 transmitted from the drive circuit 211 is selectively supplied to a gate of the first transmission transistor 331 of the light-receiving unit 330, and a second transmission or control signal TG2 transmitted from the drive circuit 211 is selectively supplied to a gate of the second transmission transistor 332. An output through the first transmission transistor 331 of the light-receiving unit 330 is connected to the pixel imaging signal generation unit 320, and an output through the second transmission transistor 332 is connected to the address event detection unit 400.

The pixel imaging signal generation unit 320 can include a reset transistor (third transistor) 321, an amplification transistor (fourth transistor) 322, a selection transistor (fifth transistor) 323, and a floating diffusion layer (FD) 324.

In accordance with at least some embodiments of the present disclosure, the first transmission transistor 331 and the second transmission transistor 332 of the light-receiving unit 330 are constituted, for example, by using an N-type metal-oxide-semiconductor (MOS) transistor (hereinafter, simply referred to as "NMOS transistor"). Similarly, the reset transistor 321, the amplification transistor 322, and the selection transistor 323 of the pixel imaging signal generation unit 320 are each constituted, for example, by using the NMOS transistor.

The address event detection unit 400 can include a current-voltage conversion unit 410 and a subtractor 430. The address event detection unit 400 can further be provided with a buffer, a quantizer, and a transmission unit. Details of the address event detection unit 400 will be described in the following description in connection with FIG. 7.

In the illustrated configuration, the photoelectric conversion element 333 of the light-receiving unit 330 photoelectrically converts incident light to generate a charge. The first transmission transistor 331 transmits a charge generated in the photoelectric conversion element 333 to the floating diffusion layer 324 of the image signal generation readout circuit 320 in accordance with the first control signal TG1. The second transmission transistor 332 supplies an electric signal (photocurrent) based on the charge generated in the photoelectric conversion element 333 to the address event detection unit 400 in accordance with the second control signal TG2.

When an instruction for image sensing is given by the processor system 130, the drive circuit 211 in the logic circuit 210 outputs the control signal TG1 for setting the first transmission transistor 331 of the light-receiving unit 330 of selected unit pixels 310 in the pixel array 300 to an ON-state. With this arrangement, a photocurrent generated in the photoelectric conversion element 333 of the light-receiving unit 330 is supplied to the pixel imaging signal generation readout circuit 320 through the first transmission transistor 331. More particularly, the floating diffusion layer 324 accumulates charges transmitted from the photoelectric conversion element 333 through the first transmission transistor 331. The reset transistor 321 discharges (initializes) the charges accumulated in the floating diffusion layer 324 in accordance with a reset signal transmitted from the drive circuit 211. The amplification transistor 322 allows a pixel signal of a voltage value corresponding to an amount of charge accumulated in the floating diffusion layer 324 to appear in a vertical signal line VSL. The selection transistor 323 switches a connection between the amplification transistor 322 and the vertical signal line VSL in accordance with a selection signal SEL transmitted from the drive circuit 211. Furthermore, the analog pixel signal that appears in the vertical signal line VSL is read out by the column ADC 220 and is converted into a digital pixel signal.

When an instruction for address event detection initiation is given by the processor system 130, the drive circuit 211 in the logic circuit 210 outputs the control signal for setting the second transmission transistor 332 of the light-receiving unit 330 in the pixel array unit 300 to an ON-state. With this arrangement, a photocurrent generated in the photoelectric conversion element 333 of the light-receiving unit 330 is supplied to the address event detection unit 400 of each unit pixel 310 through the second transmission transistor 332.

When detecting address event ignition on the basis of the photocurrent from the light-receiving unit 330, the address event detection unit 400 of each unit pixel 310 outputs a request to the arbiter 213. With respect to this, the arbiter 213 arbitrates the request transmitted from each of the unit pixels 310 and transmits a predetermined response to the unit pixel 310 that issues the request on the basis of the arbitration result. The unit pixel 310 that receives the response supplies a detection signal indicating the existence or nonexistence of the address event ignition (hereinafter, referred to as "address event detection signal") to the drive circuit 211 and the signal processor 212 in the logic circuit 210.

The drive circuit 211 can also set the second transmission transistor 332 in the unit pixel 310 that is a supply source of the address event detection signal to an OFF-state. With this arrangement, a supply of the photocurrent from the light-receiving unit 330 to the address event detection unit 400 in the unit pixel 310 is stopped.

Next, the drive circuit 211 sets the first transmission transistor 331 in the light-receiving unit 330 of the unit pixel 310 to an ON-state by the transmission signal TG1. With this arrangement, a charge generated in the photoelectric conversion element 333 of the light-receiving unit 330 is transmitted to the floating diffusion layer 324 through the first transmission transistor 331. In addition, a pixel signal of a voltage value corresponding to a charge amount of charges accumulated in the floating diffusion layer 324 appears in the vertical signal line VSL that is connected to the selection transistor 323 of the pixel imaging signal generation unit 320.

As described above, in the image sensor 200, a pixel signal SIG is output from the unit pixel 310 in which the address event ignition is detected to the column ADC 220. In accordance with further embodiments of the present disclosure, a pixel signal is output from the unit pixels 310 within a group or sub array of unit pixels 310 associated with the address of the unit pixel 310 from which an address event detection signal has been provided.

Furthermore, for example, the light-receiving unit 330, the pixel imaging signal generation unit 320, and two log (LG) transistors (sixth and seventh transistors) 411 and 414 and two amplification transistors (eighth and ninth transistors) 412 and 413 in the current-voltage conversion unit 410 of the address event detection unit 400 are disposed, for example, in the light-receiving chip 201 illustrated in FIG. 2, and other components can be disposed, for example, in the logic chip 202 that is joined to the light-receiving chip 201 through the Cu—Cu joining. Therefore, in the following description, in the unit pixel 310, configurations which are disposed in the light-receiving chip 201 are referred to as "upper layer circuit".

Figure 6B:
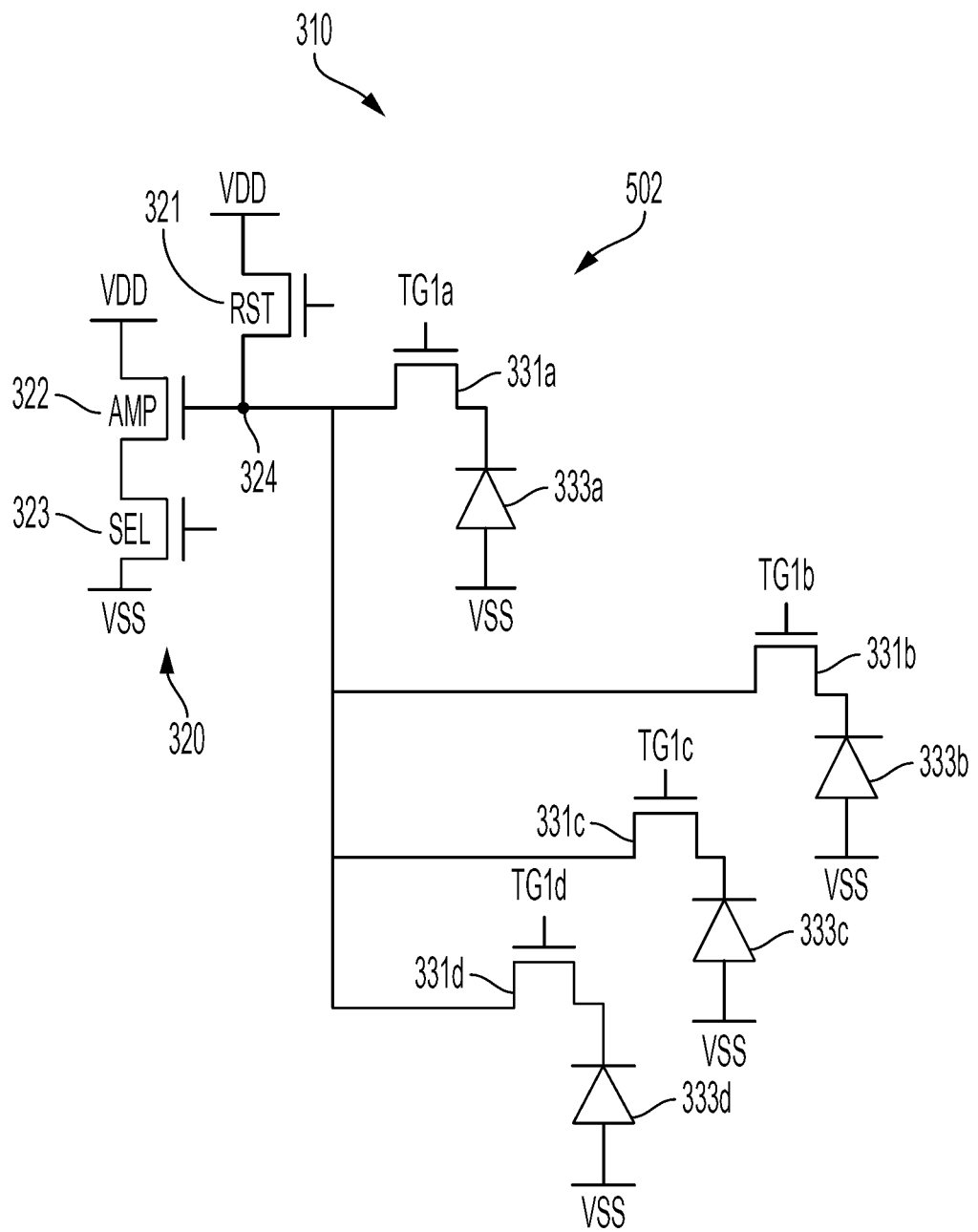
FIG. 6B is a circuit diagram illustrating a schematic configuration example of a group of image sensing pixels in accordance with embodiments of the present disclosure.

A configuration example of a group of unit pixels 310 configured as image sensing pixels 502 with a shared pixel imaging signal generation readout circuitry 320 in accordance with at least some embodiments of the present disclosure is depicted in FIG. 6B. In this example, each photoelectric conversion element 333 is selectively connected to the floating diffusion 324 via a respective transfer gate 331. In addition, the components of the pixel imaging signal readout circuit 320 are shared by the photoelectric conversion units 333. In this example, four photoelectric conversion units 333a-333d, and four corresponding transfer gates 331a-331d, are shown. However, any number of photoelectric conversion units 333 and respective transfer gates 331 can be included in connection with a shared pixel imaging signal readout circuit 320.

Figure 6C:
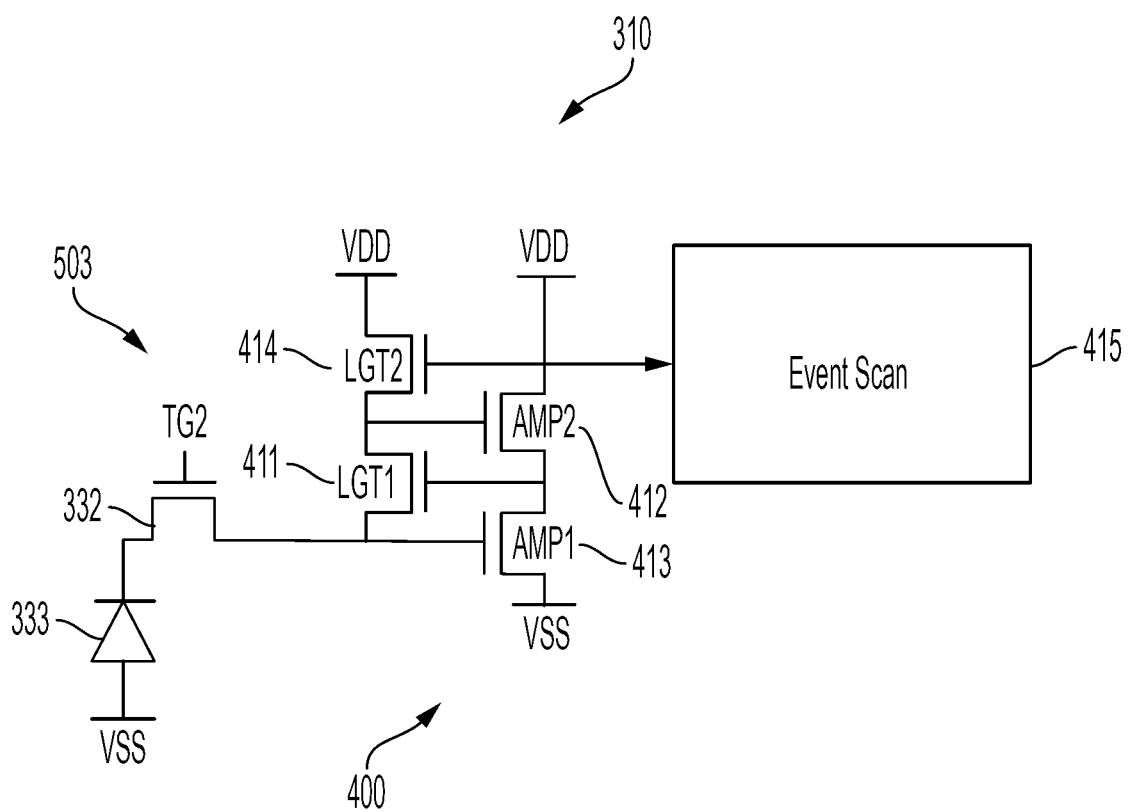
FIG. 6C is a circuit diagram illustrating a schematic configuration example of an event detection pixel in accordance with embodiments of the present disclosure.

A configuration example of a unit pixel 310 configured as a single function address event detection pixel 503 and associated address event detection readout circuit 400 elements is depicted in FIG. 6C. As shown, this example includes a single photoelectric conversion element 333 selectively connected by a transfer gate 332 to components of an address event detection readout circuit 400. An event scan control block 415 controls operation of the address event detection readout circuit 400.

Figure 7:
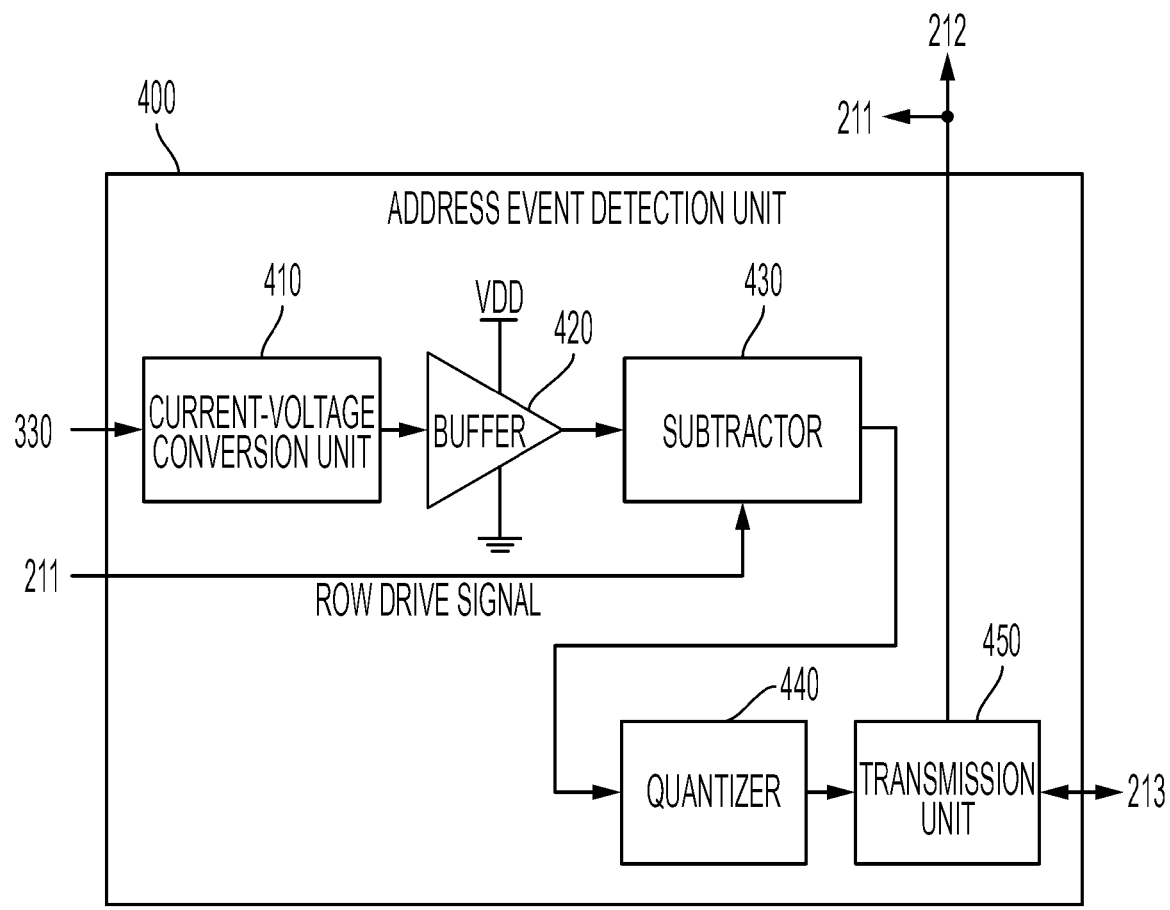
FIG. 7 is a block diagram illustrating a schematic configuration example of an address event detection unit in accordance with embodiments of the present disclosure.

FIG. 7 is a block diagram illustrating a schematic configuration example of the address event detection unit 400 according to at least some embodiments of the present disclosure. As illustrated in FIG. 7, the address event detection unit 400 includes a current-voltage conversion unit 410, a buffer 420, a subtractor 430, a quantizer 440, and a transmission unit 450. The current-voltage conversion unit 410 converts the photocurrent from the light-receiving unit 330 into a voltage signal and supplies the voltage signal generated through the conversion to the buffer 420. The buffer 420 corrects the voltage signal transmitted from the current-voltage conversion unit 410, and outputs a voltage signal after correction to the subtractor 430. The subtractor 430 lowers a voltage level of the voltage signal transmitted from the buffer 420 in accordance with a row drive signal transmitted from the drive circuit 211 and, supplies the lowered voltage signal to the quantizer 440. The quantizer 440 quantizes the voltage signal transmitted from the subtractor 430 into a digital signal, and outputs the digital signal generated through the quantization to the transmission unit 450 as a detection signal. The transmission unit 450 transmits the detection signal transmitted from the quantizer 440 to the signal processor 212 and the like. For example, when address event ignition is detected, the transmission unit 450 supplies a request for transmission of an address event detection signal from the transmission unit 450 to the drive circuit 211 and the signal processor 212 to the arbiter 213. In addition, when receiving a response with respect to the request from the arbiter 213, the transmission unit 450 supplies the detection signal to the drive circuit 211 and the signal processor 212.

The current-voltage conversion unit 410 in the configuration illustrated in FIG. 7 can include the two LG transistors 411 and 414, the two amplification transistors 412 and 413, and a constant-current circuit 415 as illustrated in FIG. 6A. For example, a source of the LG transistor 411 and a gate of the amplification transistor 413 are connected to a drain of the second transmission transistor 332 of the light-receiving unit 330. In addition, for example, a drain of the LG transistor 411 is connected to a source of the LG transistor 414 and a gate of the amplification transistor 412. For example, a drain of the LG transistor 414 is connected to a power supply terminal VDD. In addition, for example, a source of the amplification transistor 413 is grounded, and a drain thereof is connected to a gate of the LG transistor 411 and a source of the amplification transistor 412. For example, a drain of the amplification transistor 412 is connected to a power supply terminal VDD through the constant-current circuit 415. For example, the constant-current circuit 415 is constituted by a load MOS transistor such as a p-type MOS transistor. In this connection relationship, a loop-shaped source follower circuit is constructed. With this arrangement, a photocurrent from the light-receiving unit 330 is converted into a voltage signal in a logarithmic value corresponding to a charge amount thereof. Furthermore, the LG transistors 411 and 414, and the amplification transistors 412 and 413 may be each constituted, for example, by an NMOS transistor.

Figure 8:
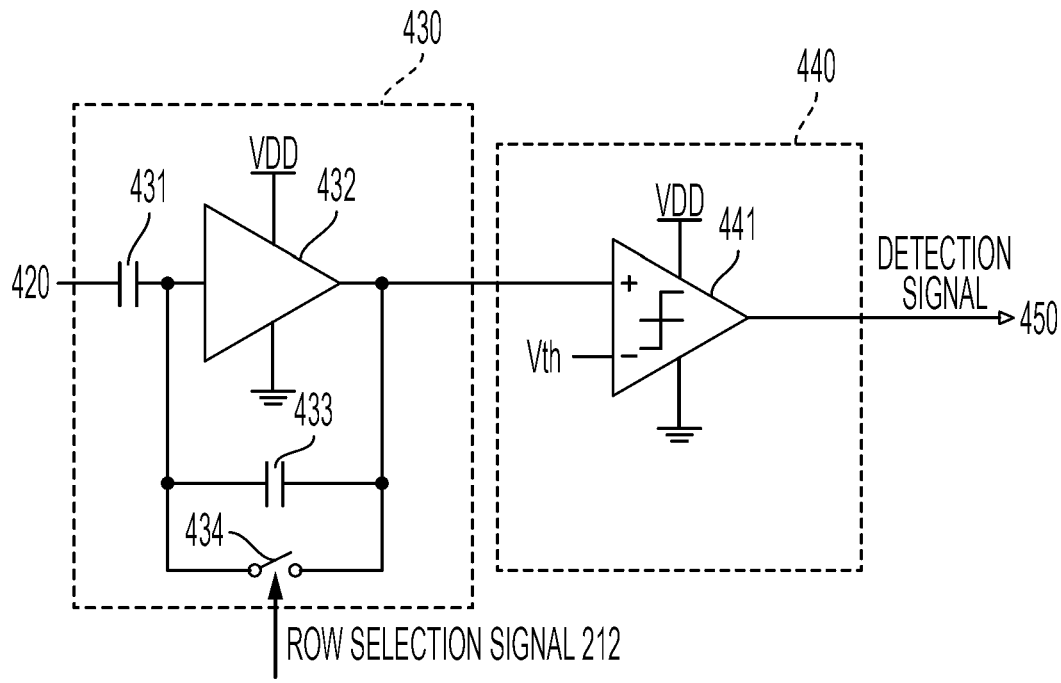
FIG. 8 is a circuit diagram illustrating a schematic configuration example of a subtractor and a quantizer in accordance with embodiments of the present disclosure.

FIG. 8 is a circuit diagram illustrating a schematic configuration example of the subtractor 430 and the quantizer 440 according to at least some embodiments of the present disclosure. As illustrated in FIG. 8, the subtractor 430 includes capacitors 431 and 433, an inverter 432, and a switch 434. In addition, the quantizer 440 includes a comparator 441. One end of the capacitor 431 is connected to an output terminal of the buffer 420, and the other end is connected to an input terminal of the inverter 432. The capacitor 433 is connected to the inverter 432 in parallel. The switch 434 opens or closes a route connecting both ends of the capacitor 433 in accordance with a row drive signal. The inverter 432 inverts a voltage signal that is input through the capacitor 431. The inverter 432 outputs an inverted signal to a non-inverting input terminal (+) of the comparator 441. When the switch 434 is turned on, a voltage signal Vinit is input to a buffer 420 side of the capacitor 431. In addition, the opposite side becomes a virtual ground terminal. A potential of the virtual ground terminal is set to zero for convenience. At this time, when a capacity of the capacitor 431 is set as C1, a potential Qinit that is accumulated in the capacitor 431 is expressed by the following Expression (1). On the other hand, both ends of the capacitor 433 are short-circuited, and thus an accumulated charge thereof becomes zero.

$$Qinit = C1 \times Vinit \qquad (1)$$

Next, when considering a case where the switch 434 is turned off, and a voltage of the capacitor 431 on the buffer 420 side varies and reaches Vafter, a charge Qafter accumulated in the capacitor 431 is expressed by the following Expression (2).

$$Qafter = C1 \times Vafter \qquad (2)$$

On the other hand, when an output voltage is set as Vout, a charge Q2 accumulated in the capacitor 433 is expressed by the following Expression (3).

$$Q2 = -C2 \times Vout \qquad (3)$$

At this time, a total charge amount of the capacitors 431 and 433 does not vary, and thus the following Expression (4) is established.

$$Qinit = Qafter + Q2 \qquad (4)$$

When Expression (1) to Expression (3) are substituted for Expression (4), the following Expression (5) is obtained.

$$Vout = -(C1/C2) \times (Vafter - Vinit) \qquad (5)$$

Expression (5) represents a subtraction operation of a voltage signal, and a gain of the subtraction result becomes C1/C2. Typically, it is desired to maximize (or alternatively, improve) the gain, and thus it is preferable to make a design so that C1 becomes large and C2 becomes small. On the other hand, when C2 is excessively small, kTC noise increases, and thus there is a concern that noise characteristics deteriorate. Accordingly, a reduction in the capacity of C2 is limited to a range capable of permitting noise. In addition, since the address event detection unit 400 including the subtractor 430 is mounted for every unit pixel 310, a restriction on an area is present in capacities C1 and C2. Values of the capacities C1 and C2 are determined in consideration of the restriction.

The comparator 441 compares a voltage signal transmitted from the subtractor 430 and a predetermined threshold voltage Vth that is applied to an inverting input terminal (−). The comparator 441 outputs a signal indicating the comparison result to the transmission unit 450 as a detection signal. In addition, when a conversion gain by the current-voltage conversion unit 410 is set as $CG_{log}$, and a gain of the buffer 420 is set to "1", a gain A of the entirety of the address event detection unit 400 is expressed by the following Expression (6).

[Math. 1]

$$A = \frac{CG_{log} \cdot C1}{C2} \sum_{n=1}^{N} i_{photo\_n} \qquad (6)$$

In Expression (6), $i_{photo\_}n$ represents a photocurrent of an nth unit pixel 310, and a unit thereof is, for example, an ampere (A). N represents the number of the unit pixels 310 in a pixel block and is "1" in this embodiment.

Figure 9:
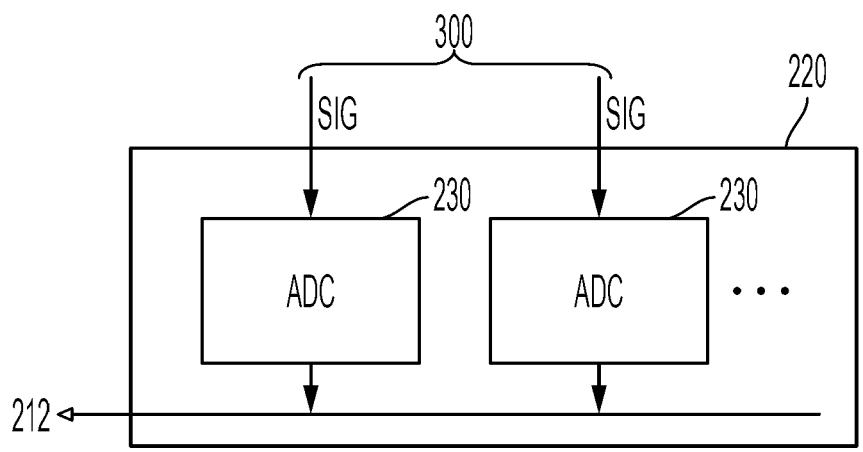
FIG. 9 is a block diagram illustrating a schematic configuration example of a column ADC in accordance with embodiments of the present disclosure.

FIG. 9 is a block diagram illustrating a schematic configuration example of the column ADC according to at least some embodiments of the present disclosure. The column ADC 220 includes a plurality of ADCs 230 which are provided for every column of the unit pixels 310. Each of the ADCs 230 converts an analog pixel signal that appears in the vertical signal line VSL into a digital signal. For example, the pixel signal is converted into a digital signal in which a bit length is greater than that of a detection signal. For example, when the detection signal is set to two bits, the pixel signal is converted into a digital signal of three or greater bits (16 bits and the like). The ADC 230 supplies a generated digital signal to the signal processor 212.

Next, an operation of the image sensor 200 according to at least embodiments of the present disclosure will be described in detail with reference to the accompanying drawings.

Figure 10A:
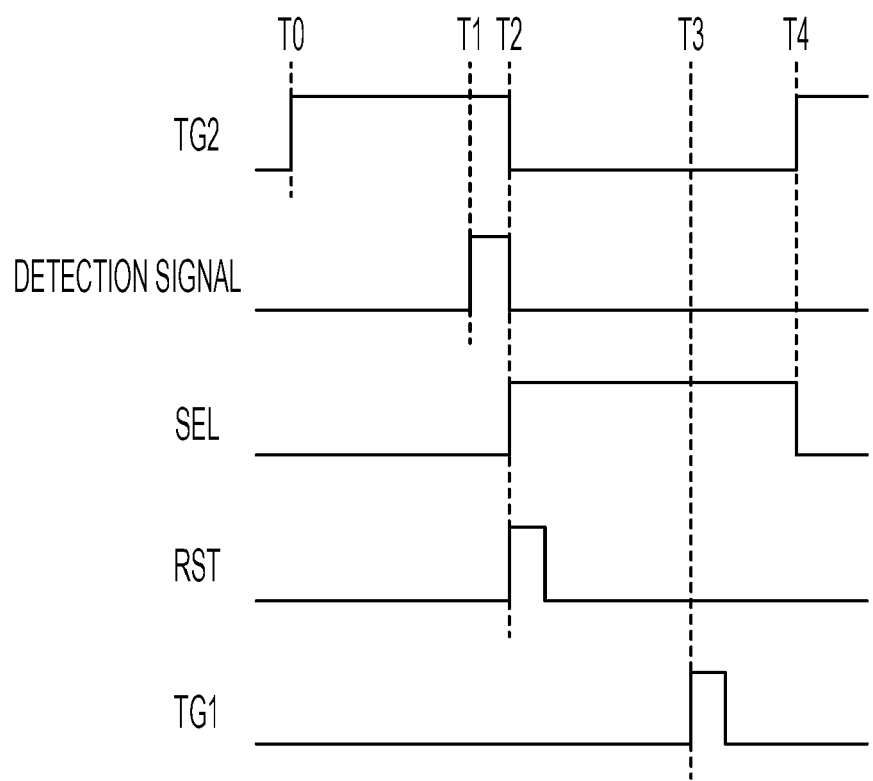
FIG. 10A is a timing chart illustrating an example of an operation of an image sensor in accordance with embodiments of the present disclosure.

First, an example of the operation of the image sensor 200 will be described by using a timing chart. FIG. 10A is a timing chart illustrating an example of the operation of the image sensor according to an embodiment of the present disclosure.

As illustrated in FIG. 10A, at a timing T0, when an instruction for address event detection initiation is given by the processor system 130, the drive circuit 211 raises the control signal TG2 applied to the gate of the second transmission transistor 332 of all of the light-receiving units 330 in the pixel array unit 300 to a high level. With this arrangement, the second transmission transistors 332 of all of the light-receiving units 330 enter an ON-state, and a photocurrent based on a charge generated in the photoelectric conversion element 333 of each of the light-receiving units 330 is supplied from each the light-receiving units 330 to each of a plurality of the address event detection units 400.

In addition, in a period in which the control signal TG2 is at a high level, all of the transmission signals TG1 applied to the gate of the first transmission transistor 331 in each of the light-receiving units 330 are maintained at a low level. Accordingly, in this period, a plurality of the transmission transistors 331 in all of the light-receiving units 330 are in an OFF-state.

Next, a case where the address event detection unit 400 of an arbitrary unit pixel 310 configured to perform event detection detects address event ignition in a period in which the control signal TG2 is in a high level will be assumed. In this case, the address event detection unit 400 that detects the address event ignition transmits a request to the arbiter 213. With respect to this, the arbiter 213 arbitrates the request, and returns a response for the request to the address event detection unit 400 that issues the request.

The address event detection unit 400 that receives the response raises a detection signal that is input to the drive circuit 211 and the signal processor 212 to a high level, for example, in a period of a timing T1 to a timing T2. Furthermore, in this description, it is assumed that the detection signal is a one-bit signal.

The drive circuit 211 to which a high-level detection signal is input from the address event detection unit 400 at the timing T1 lowers all control signals TG2 to a low level at a subsequent timing T2. With this arrangement, supply of a photocurrent from all of the light-receiving units 330 of the pixel array unit 300 to the address event detection unit 400 is stopped.

In accordance with embodiments of the present disclosure, where a determination by the processor system 130 is made that pixel imaging signal generation circuit 320 should be enabled, at the timing T2, the drive circuit 211 raises a selection signal SEL that is applied to a gate of the selection transistor 323 in the pixel imaging signal generation unit 320 of the unit pixel 310 in which the address event ignition is detected (hereinafter, referred to as "reading-out target unit pixel") to a high level, and raises a reset signal RST that is applied to a gate of the reset transistor 321 of the same pixel imaging signal generation unit 320 to a high level for a constant pulse period, thereby discharging (initializing) charges accumulated in the floating diffusion layer 324 of the pixel imaging signal generation unit 320. In this manner, a voltage, which appears in the vertical signal line VSL in a state in which the floating diffusion layer 324 is initialized, is read out by the ADC 230 connected to the vertical signal line VSL in the column ADC 220 as a reset-level pixel signal (hereinafter, simply referred to as "reset level"), and is converted into a digital signal.

Next, at a timing T3 after reading out the reset level, the drive circuit 211 applies a transmission signal TRG of a constant pulse period to the gate of the first transmission transistor 331 of the light-receiving unit 330 in the reading-out target unit pixel 310. With this arrangement, a charge generated in the photoelectric conversion element 333 of the light-receiving unit 330 is transmitted to the floating diffusion layer 324 in the pixel imaging signal generation unit 320, and a voltage corresponding to charges accumulated in the floating diffusion layer 324 appears in the vertical signal line VSL. In this manner, the voltage that appears in the vertical signal line VSL is read out by the ADC 230 connected to the vertical signal line VSL in the column ADC 220 as a signal-level pixel signal of the light-receiving unit 330 (hereinafter, simply referred to as "signal level") and is converted into a digital value.

The signal processor 212 executes CDS processing in which a difference between the reset level and the signal level which are read out as described above is obtained as a net pixel signal corresponding to a light-reception amount of the photoelectric conversion element 333.

Next, at a timing T4, the drive circuit 211 lowers the selection signal SEL that is applied to the gate of the selection transistor 323 in the pixel imaging signal generation readout circuit 320 of the reading-out target unit pixel 310 to a low level, and raises the control signal TG2 that is applied to the gate of the second transmission transistor 332 of all of the light-receiving units 330 in the pixel array unit 300 to a high level. With this arrangement, address event ignition detection in all of the light-receiving units 330 in the pixel array unit 300 is restarted.

Figure 10B:
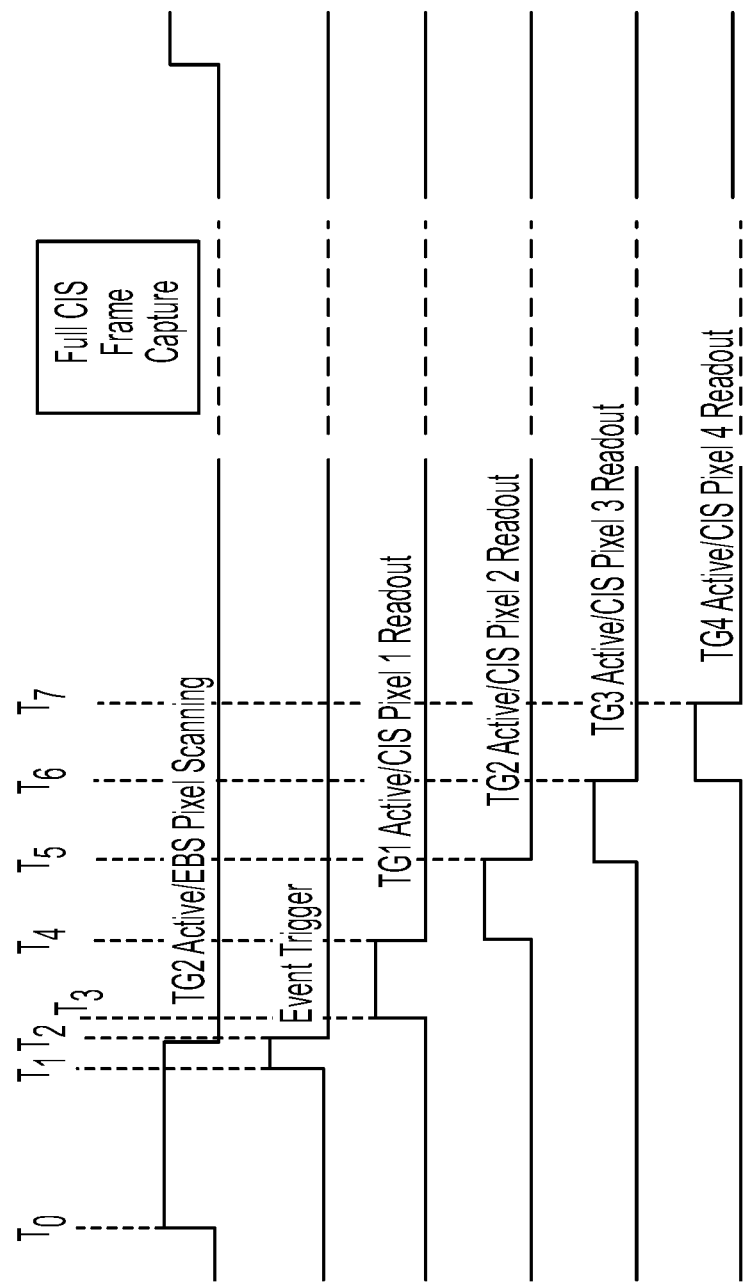
FIG. 10B is a timing chart illustrating an example of an operation of an image sensor in accordance with other embodiments of the present disclosure.

FIG. 10B is a timing chart illustrating an example of an operation of an image sensor in accordance with other embodiments of the present disclosure. At a timing T0, when an instruction for address event detection initiation is given by the processor system 130, the drive circuit 211 raises the control signal TG2 applied to the gate of the transmission transistor 332 associated with photoelectric conversion elements 333 of selectively activated address event detection units 400. More particularly, some or all of the address event detection units 400 may be activated.

In addition, the transmission signal TG1 applied to the gates of the first transmission transistors 331 are maintained in a low level. Accordingly, the associated transmission transistors 331 are in an OFF-state.

In this example, an arbitrary address event detection unit 400 detects address event ignition at a time T1 during which the control signal TG2 is at a high level, and the associated transmission transistor 332 is in an ON-state. In response to the event trigger, image frame capture begins. The image frame capture can be a full frame image capture that involves all of the image sensing pixels 502 included in the pixel array 300. Alternatively, an event detection by a particular event detection unit 400 can operate as a trigger for image capture of by a set of image sensing pixels 502 in a vicinity of the event detection unit 400, or otherwise associated with the event detection unit 400. Readout of signals obtained by the image sensing pixels can then be performed. Moreover, as discussed elsewhere herein, the processor system 130 can operate to control the frame rate of enabled image sensing pixels 502 or circuits 320.

Figure 11:
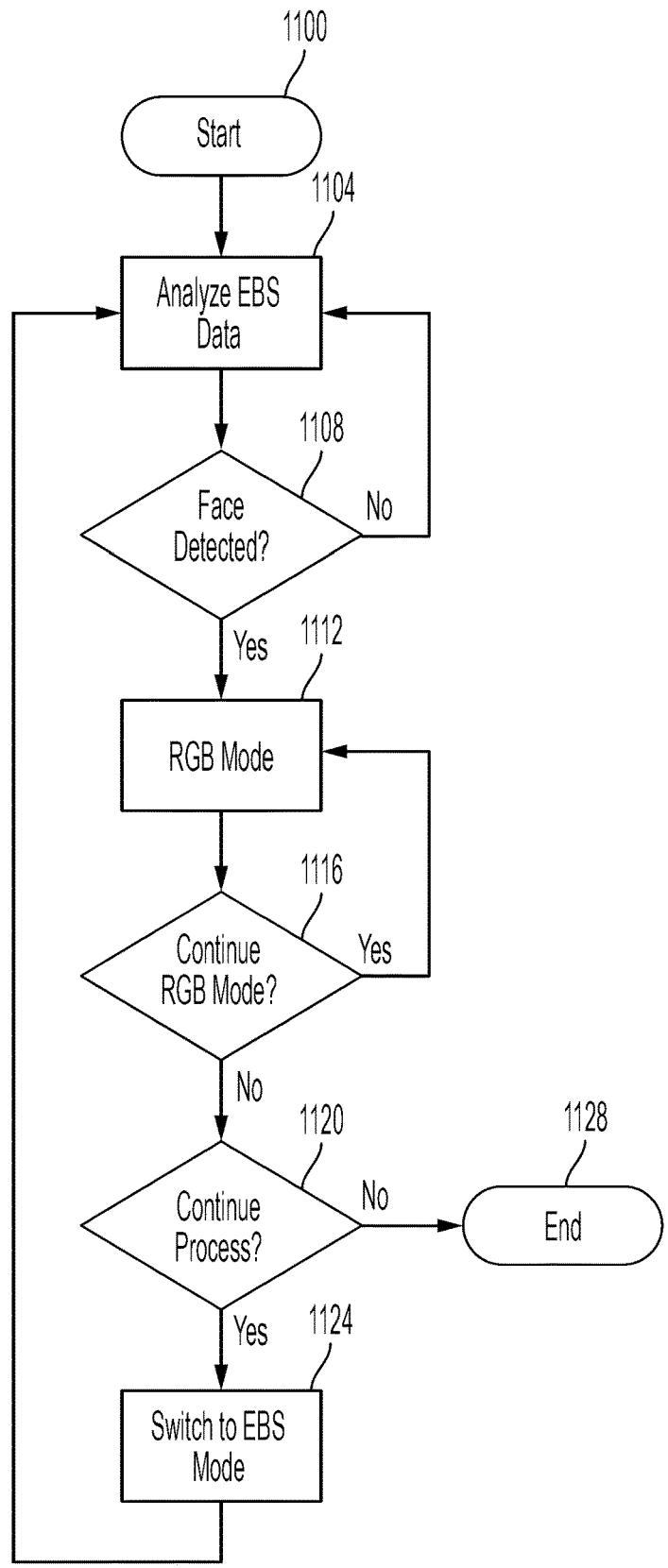
FIG. 11 is a flowchart illustrating an example of the operation of an imaging device in accordance with embodiments of the present disclosure.

FIG. 11 illustrates aspects of the operation of an imaging device 100 in accordance with embodiments of the present disclosure according to at least some embodiments of the present disclosure. Initially, the imaging device 100 may be monitoring a scene (step 1100) in a EBS mode. In at least some operating scenarios, monitoring a scene in EBS mode includes one or more pixels outputting EBS data to a processor in communication with the imaging device.

As the imaging device 100 monitors the scene, the EBS data output by the pixels may be analyzed by a processor (step 1104). The processor may be configured to be capable of analyzing EBS data to detect changes in light intensity within the scene. As can be appreciated by one of skill in the art after consideration of the present disclosure, the shared event detection and image sensing 501 or address event detection 503 pixels can be operated such that events, in the form of changes in light intensity within the scene are detected. Moreover, in accordance with at least some embodiments of the present disclosure, the imaging device 100 may be operated to detect events continuously.

The detection operation can be performed by the drive circuit 211, and/or through execution of application programming by the processor system 130. As can be appreciated by one of skill in the art after consideration of the present disclosure, events are generally indicated by signals output from one or more event detection pixels 501, 503 within the pixel array 300.

In analyzing the EBS data, the processor may be capable of detecting a triggering event. A triggering event may be detected by the processor by identifying one or more of a plurality of possible patterns or otherwise event associated information in EBS data. For example, a triggering event may be detected by monitoring event density in EBS data and determining that an object exists. In some embodiments, EBS data may be used as an input to a neural network which may output a decision as to whether a triggering event has occurred. For example, a neural network may be trained to detect a face or a set of desired object categories in input EBS data or to otherwise detect a set of meaningful events in input EBS data.

If a triggering event is detected at step 1108, the processor may generate a signal to switch the sensor into RGB mode in step 1112. If a triggering event is not detected at step 1108, the method may return to step 1104 in which EBS data is analyzed.

After a triggering event is detected at step 1108, the RGB mode may be activated in step 1112. In some embodiments, after the triggering event has been detected, a determination can be made relating to parameters that should be applied in collecting image data in the RGB mode. For example, the imaging system 100 can be operated to activate the entire frame to collect data in the RGB mode, or to activate a region of the frame to collect data in the RGB mode. In another example, the imaging system 100 can be operated to collect image data at a particular frame rate.

A determination can then be made as to whether to discontinue image sensing operations (step 1116). In accordance with embodiments of the present disclosure, the acquisition of image information can continue for a predetermined period of time or until a predetermined number of frames of image data have been acquired. Accordingly, the acquisition of image information can be discontinued after an initial image or set of images has been acquired. In accordance with still other embodiments of the present disclosure, image information can continue to be acquired for as long as a detected object remains within the field of view 114 of the imaging system 100. The acquisition of image information related to an object can be discontinued after the object is determined to have left the field of view of the imaging device 100. As yet another alternative, the acquisition of image information related to an object can be continued until sufficient image information has been acquired to allow application programming executed by the processor system 130 of the imaging system 104 of an associated system, to perform object recognition and to determine that image acquisition operations associated with that object can be discontinued.

After a determination that image sensing operations can be discontinued, a determination can next be made as to whether operation of the image sensor system 100 should be discontinued (step 1120). If operation is to continue, the process can involve switching from the RGB mode back to the EBS mode in step 1124 before returning to step 1104. Otherwise, the operation can end at step 1128.

Figure 12A:
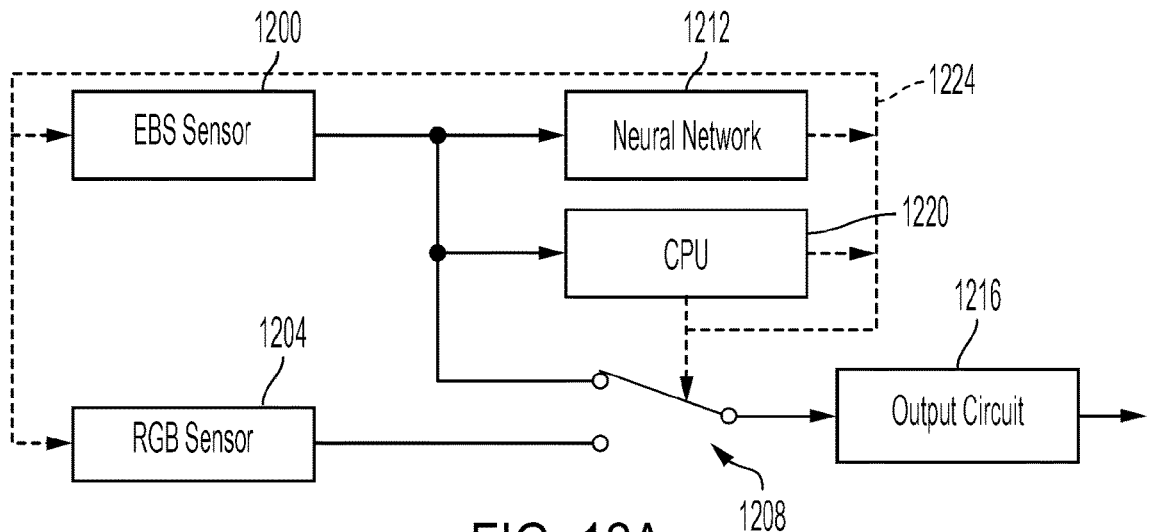
FIG. 12A is a block diagram of an image sensor system with an EBS sensor and an RGB sensor in accordance with embodiments of the present disclosure.
Figure 12B:
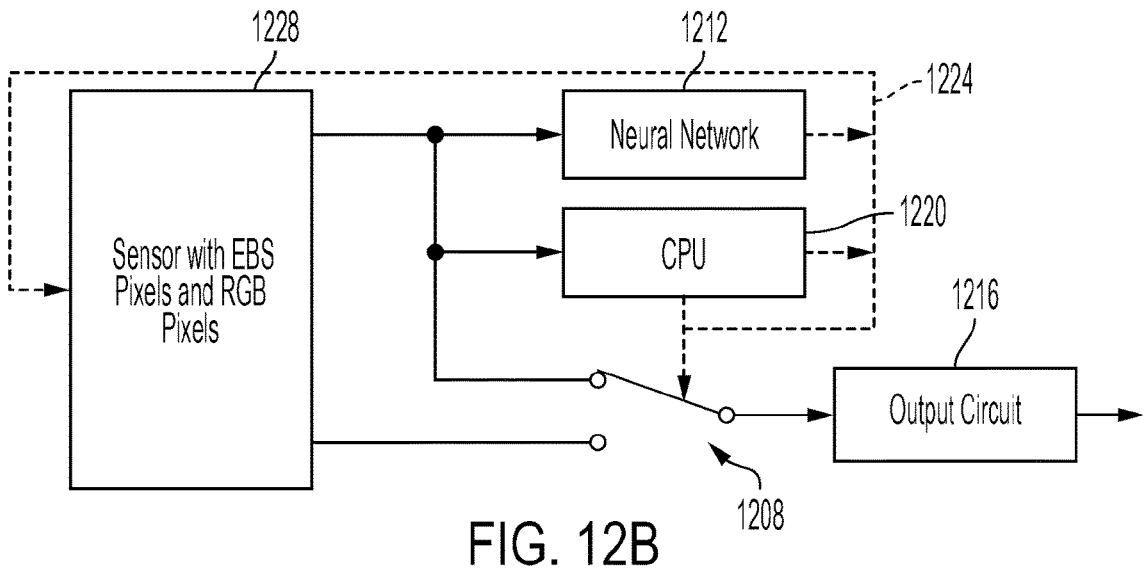
FIG. 12B is a block diagram of an image sensor system with a sensor with both EBS and RGB pixels in accordance with embodiments of the present disclosure.
Figure 12C:
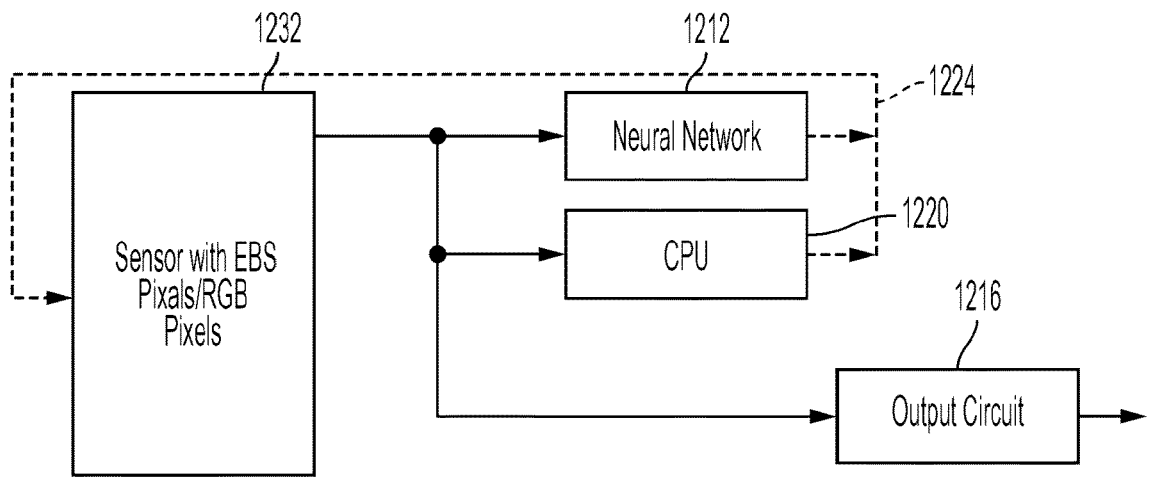
FIG. 12C is a block diagram of an image sensor system with a sensor with pixels capable of sensing both EBS and RGB data in accordance with embodiments of the present disclosure.

FIGS. 12A, 12B, and 12C are block diagrams illustrating a variety of systems for switching between EBS pixel signals and RGB pixel signals. As discussed above in relation to FIGS. 5A-5D, various configurations of an imaging device 100 may be implemented in various embodiments. For example, as illustrated in FIG. 5A, an image sensor 200 may have a first or EBS sensor 530 and a second or imaging sensor 540. As illustrated in FIG. 5B, an image sensor 200 may have pixels 310 configured as combined or shared event detection and image sensing pixels 501 which may be selectively operated in event detection or image sensing modes. As illustrated in FIG. 5C, an image sensor 200 may have an array of unit pixels 310 including a plurality of event detection pixels 503 and a plurality of image sensing pixels 502. No matter the type of image sensor 200 being used, the switching between event detection or EBS mode and the image sensing or RGB mode may be implemented with a switching system as illustrated in FIGS. 12A, 12B, and 12C.

As can be appreciated in FIG. 12A, EBS pixel data may be output by an EBS sensor 1200 and RGB pixel data may be output by an image sensor 1204 as described above in relation to FIGS. 5A-5F. The EBS pixel data and RGB pixel data may be output simultaneously or separately depending on implementation. EBS pixel data may be input into an EBS event analysis system such as a processor or CPU 1220 in communication with the image sensor 200 as well as a computer system executing a neural network 1212. In some embodiments, the CPU 1220 may be capable of executing the neural network itself and thus a separate neural network 1212 may not be necessary.

The neural network 1212 of FIG. 12A may implement a convolutional neural network or some other type of analysis algorithm. The neural network 1212 may be capable of controlling a switch 1208. In some embodiments, the switch 1208 may be controlled by the CPU 1220. The switch 1208 may be, for example, a transistor. The switch 1208 may control the flow of data from the EBS pixels and the RGB pixels to an output circuit 1216. In this way, the neural network 1212 may be capable of analyzing data from the EBS sensor 1200 and, based on analysis of the EBS pixel data, control whether EBS pixel data or RGB pixel data is output from the imaging device 100. The neural network 1212 and/or CPU 1220 may be capable of controlling a frame rate or other data capture quality variable of the EBS sensor 1200 and/or RGB or image sensor 1204 via a feedback system 1224. The entire frame of RGB data may be sent to the output circuit, or a region of the RGB frame may be sent to the output circuit. The frame rate or other data capture quality variable may be altered based on qualities of any detected object. For example, a faster object may warrant increasing a frame rate.

Switching logic may be used to switch a sensor from a EBS data mode to an RGB data mode and vice versa. In some embodiments, EBS data may be analyzed by a computer system capable of controlling a switch to switch the EBS/RGB switchable sensor between EBS and RGB mode. Analysis may be performed through a neural network or another method of data analysis. Depending on decision logic, an output circuit may output either EBS or RGB data from the sensor.

For example, a processor may be configured to process an output from a sensor operating in a EBS mode and/or a sensor operating in an RGB mode. The processor may be configured to output an event signal based on EBS data and/or output an image signal based on RGB data. The processor may further be configured to select between the EBS mode and RGB mode based on processing of EBS and/or RGB data.

As illustrated in FIGS. 12B and 12C, a single sensor with capabilities for both EBS data and image data may be used. For example, as illustrated in FIG. 12B, EBS pixel data and RGB pixel data may be output by a sensor 1228 with both EBS pixels and RGB pixels as described above in relation to FIGS. 5A-5F. The EBS pixel data and RGB pixel data may be output simultaneously or separately depending on implementation. EBS pixel data may be input into a EBS event analysis system such as a processor or CPU 1220 in communication with the image sensor 200 as well as a computer system executing a neural network 1212. In some embodiments, the CPU 1220 may be capable of executing the neural network itself and thus a separate neural network 1212 may not be necessary.

The neural network 1212 of FIG. 12B may implement a convolutional neural network or some other type of analysis algorithm. The neural network 1212 may be capable of controlling a switch 1208. In some embodiments, the switch 1208 may be controlled by the CPU 1220. The switch 1208 may be, for example, a transistor. The switch 1208 may control the flow of data from the EBS pixels and the RGB pixels to an output circuit 1216. In this way, the neural network 1212 may be capable of analyzing data from the sensor 1228 and, based on analysis of the EBS pixel data, control whether EBS pixel data or RGB pixel data is output from the imaging device 100. The neural network 1212 and/or CPU 1220 may be capable of controlling a frame rate or other data capture quality variable of the sensor 1200 via a feedback system 1224. The frame rate or other data capture quality variable may be altered based on qualities of any detected object. For example, a faster object may warrant increasing a frame rate.

In an alternative embodiments, as illustrated in FIG. 12C, EBS pixel data and RGB pixel data may be output by a sensor 1232 with pixels capable of generating both EBS pixel data and RGB pixel data as described above in relation to FIGS. 5A-5F. The EBS pixel data and RGB pixel data may be output simultaneously or separately depending on implementation. EBS pixel data may be input into a EBS event analysis system such as a processor or CPU 1220 in communication with the image sensor 200 as well as a computer system executing a neural network 1212. In some embodiments, the CPU 1220 may be capable of executing the neural network itself and thus a separate neural network 1212 may not be necessary.

The neural network 1212 of FIG. 12C may implement a convolutional neural network or some other type of analysis algorithm. The neural network 1212 may be capable of controlling the sensor 1232 via the feedback system 1224. In some embodiments, the feedback system 1224 may be controlled by the CPU 1220. The feedback system 1224 may control the flow of data from the EBS pixels and the RGB pixels to an output circuit 1216. In this way, the neural network 1212 may be capable of analyzing data from the sensor 1228 and, based on analysis of the EBS pixel data, control whether EBS pixel data or RGB pixel data is output from the imaging device 100.

Whether an event warrants switching from EBS to RGB depends on the application. Many methods of switching which support a low power design may be used and certain embodiments may be as described herein.

For example, depending on application, one or more of the following methods may be used to determine when and whether to switch from EBS to RGB mode: a detection of a high EBS event density, detection of a low EBS event density, analysis of EBS data by a neural network, analysis of EBS data by a recurrent neural network, detection of EBS motion in a particular direction. It should be noted that such methods should not be considered as the only possible methods of determining when and whether to switch from EBS mode to RGB mode.

Data collected via the EBS mode may also be used to determine to send the entire frame of RGB data to the output or send a region of the RGB frame to the output. The EBS data may also be used to determine speed of an object and may be used to switch to a higher frame rate.

In one embodiment, a sensor may be switched from EBS mode to RGB mode when EBS event density exceeds a threshold amount in the entire scene or a predefined region of the scene. Such an embodiment may be useful for capturing motion. For example, a sensor set to switch from EBS mode to RGB mode based on EBS event density exceeding a threshold amount may be used to recognize a vehicle entering into a scene or to recognize a person entering a room, etc.

In some embodiments, the processor system 130 may be capable of using event detection data to determine a frame rate to apply to the RGB mode. The determined frame rate for the RGB mode can be based on the identity of the object as determined from the event detection data, the relative velocity of the object, or a degree of interest in an identified object. For example, a relatively high frame rate could be applied to an automobile, a moderate frame rate can be applied to a cyclist, and a relatively low frame rate can be applied to a pedestrian. A higher frame rate can be applied to an object moving at a faster apparent velocity than an object that is stationary or moving at a lower apparent velocity.

The various operations performed by the processing system 130 on the event detection data and/or the image data can include applying one or more neural networks to analyze the collected information.

Embodiments of the present disclosure can continue to operate event detection pixels 502, 503 while image sensing pixels 501, 502 are in operation. As noted elsewhere herein, event detection pixels 502, 503 generally operate asynchronously. By continuing to operate the event detection pixels 502, 503, event detection functions can be performed continuously, without loss or diminution of temporal event detection performance of the imaging device 100.

Accordingly, embodiments of the present disclosure provide imaging devices 100 with one or more pixel arrays 300 that are capable of performing both event detection and imaging operations. Moreover, the event detection pixels can be operated continuously, and the image sensing pixels can be operated selectively. Moreover, a frame rate applied for operation of the image sensing pixels can be selected based on characteristics of or an identification of the detected event or events. After a selected time period, after an event being imaged is no longer present, or after some other criterion has been met, operation of the image sensing pixels can be discontinued, while operation of the event detection pixels continues. Accordingly, continuous monitoring for events is provided in combination with selected imaging operations, thereby providing relevant image data while conserving power, data transmission, and data processing resources.

EBS sensors or sensors comprising EBS pixels may be capable of generating frames of data indicating changes in light intensity. For example, a positive change in light intensity may be reflected in a frame by a pixel of a value such as +1 or a particular color such as red. A negative change in light intensity may similarly be reflected in a frame by pixel of a particular value such as −1 or of another color such as blue. If a EBS pixel does not detect a change in light intensity, a zero value or a color such as white may be used.

In some embodiments, a EBS sensor or a sensor comprising EBS pixels may be capable of indicating an amount of change in light intensity. For example, a relatively high change in light intensity may be reflected by a pixel of a value of +1.00 while a relatively low, but positive, change in light intensity may be reflected by a value of +0.01 for example. The values +1.00 and +0.01 may be represented by an 8-bit digital value of 255 and 1, respectively. Similarly, a range of colors may be used to indicate amounts of change.

However, EBS cameras provide change information and time information only. For example, data from EBS sensors corresponding to an event for a pixel may correspond to three states: −1 indicates a negative change, +1 indicates a positive change, and 0 indicates no change. Information on the time of change may also be provided. EBS cameras alone do not provide color information or shades of gray. For this reason, EBS cameras are not general purpose cameras for capturing image or video information. The above references to EBS pixels being associated with pixels of colors should not be interpreted as EBS pixels being associated with colors from a scene but instead the use of colors only as a visualization of changes in light intensity.

When operating in EBS mode, a EBS/RGB switchable sensor may operate in a relatively lower power consumption state. When operating in RGB mode, the EBS/RGB switchable sensor may operate in a relatively higher power consumption state. For this reason, the EBS mode may be used for lower power and the RGB mode may be activated, or switched to, only as needed.

Switching logic may be used to switch a sensor from a EBS data mode to an RGB data mode and vice versa. In some embodiments, switching logic may be used to only switch the RGB data on and off. In some embodiments, EBS data may be analyzed by a computer system capable of controlling a switch to switch the EBS/RGB switchable sensor between EBS and RGB mode. Analysis may be performed through a neural network or another method of data analysis. Depending on decision logic, an output circuit may output either EBS or RGB data from the sensor.

For example, a processor may be configured to process an output from a sensor operating in a EBS mode and/or a sensor operating in an RGB mode. The processor may be configured to output an event signal based on EBS data and/or output an image signal based on RGB data. The processor may further be configured to select between the EBS mode and RGB mode based on processing of EBS and/or RGB data.

Whether an event warrants switching from EBS to RGB depends on the application. Many methods of switching which support a low power design may be used and certain embodiments may be as described herein.

In some embodiments, a switch between EBS and RGB mode may be triggered based on processing of EBS frames with a convolutional neural network ("CNN"). In such an embodiment, EBS frames may be fed to a classification CNN such as a LeNet, VGG16, ResNet, etc., to a detection CNN such as a RCNN, YOLO, SSD, etc., or other types of neural network. If a specific object, such as a person, a face or vehicle, is recognized or otherwise detected with a high probability, RGB mode may be triggered to capture a color image of the object for further analysis.

If the neural network decides the probability of a certain category of object, such as a person, a face or a car, exceeds a pre-defined threshold, the RGB mode may be triggered.

For example, one or more EBS frames may be used as an input to a CNN which may output a triggering decision. In some embodiments, a single EBS frame may be used as an input to generate a triggering decision. A single EBS frame may be a collection of EBS signals collected over a particular time frame such as 1 millisecond. In some embodiments, a number of EBS frames may be used as an input. For example, a series of EBS frames taken over a given time period, for example 1 second, may be used.

A CNN may comprise a number of layers and may be trained to detect one or more types of EBS-related events. For example, a CNN may comprise a number of convolutional layers (e.g., conv1, conv2, conv3, conv4, conv5, etc.) and one or more max pooling layers. A CNN may be trained through a process of inputting EBS frames showing known events. In some embodiments, a CNN may be trained to output a triggering decision in the event of detecting EBS data showing the occurrence of a particular event. A triggering decision may be as simple as a +1 for yes and a 0 for no. In some embodiments, a triggering decision may be more complex, for example, an identification of an event type for a detected event. For example, the CNN may detect an input with EBS data showing a high number of events which exceeds a pre-defined spatio-temporal density, or the CNN may detect an input with EBS data which is recognized by the CNN as being indicative of an existence of a particular object such as a person, a face or vehicle. The triggering decision may include information about the object as detected and/or recognized by the CNN.

Figure 13:
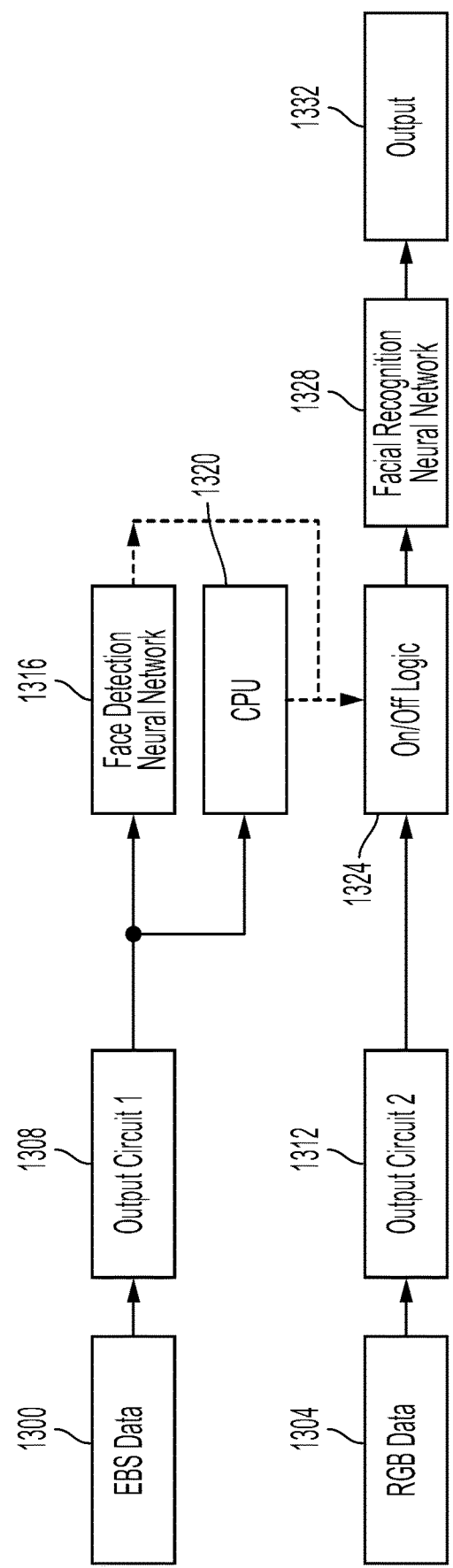
FIG. 13 depicts block diagram of an image processing system in accordance with embodiments of the present disclosure.

A block diagram of certain embodiments of the present disclosure is illustrated in FIG. 13. As can be appreciated, an image system capable of receiving EBS data 1300 and RGB data 1304 as inputs may be capable of generating an output. The EBS data 1300 may be output from a EBS sensor or other type of sensor capable of generating EBS data 1300. The EBS data 1300 may be input into an output circuit 1308 capable of processing EBS data 1300 for further analysis by one or more of a face detection neural network 1316 and/or a CPU 1320. The face detection neural network 1316 may be a neural network such as a CNN trained to detect faces in EBS data. While the present embodiment is a system for detecting and recognizing faces, it should be appreciated that the same principles may be applied to detecting and recognizing other types of objects.

RGB data 1304 may be input into an output circuit 1312 capable of processing RGB data 1304 for further analysis by a facial recognition neural network 1328. The facial recognition neural network 1328 may be a neural network such as a CNN trained to recognize faces in RGB data. Specifically, it is trained to determine the identity of the face. While the present embodiment is a system for detecting and recognizing faces, it should be appreciated that the same principles may be applied to detecting and recognizing other types of objects.

Prior to the RGB data 1304 being input into the facial recognition neural network, the RGB data 1304 may be input into an on/off logic system 1324 which may be controlled by one or both of the face detection neural network and/or the CPU 1320. For example, the face detection neural network 1316 may be trained to switch the on/off logic system 1324 upon detecting one or more faces in the input EBS data.

When the on/off logic system 1324 is switched to allow RGB data 1304 to be input into the facial recognition neural network 1328, the facial recognition neural network 1328 may begin processing the RGB data 1304 to recognize faces in the RGB data 1304. The facial recognition neural network 1328 may then output information relating to any recognized faces into an output circuit 1332. For example, the neural network may be in communication with one or more online databases which may be used to gather names or other identifying information relating to the recognized faces. Such identifying information may be output into the output circuit 1332.

Using a system as illustrated in FIG. 13 in accordance with the systems and methods described herein, an object recognition system may be implemented. Such an object recognition system may comprise a first sensor, such as a EBS sensor configured to detect a change of an amount of light intensity, a second sensor, such as an RGB sensor configured to detect an amount of light intensity, and a processor.

The processor may be configured to process an output from the first sensor and output an event signal. For example, the processor may be capable of processing EBS data to detect the presence of one or more faces or other objects in the EBS data. If a face or other object is detected, the processor may be configured to process an object detection based on the event signal. For example, the processor may be capable of detecting an object in EBS data and then recognize what type of object or the identity of the object that has been detected. In some embodiments, the processor may be trained to specifically detect facial data. The processor may be further configured to process an object recognition based on an output from the second sensor according to the object detection. For example, upon detecting a face in the EBS data, the processor may next analyze RGB data of the same or a similar scene and make an attempt to recognize any face in the RGB data.

In some embodiments, the RGB sensor may not be activated unless and until a face (or other type of object) has been detected using EBS data. In response to detecting a face (or other type of object) the processor may be configured to activate the second sensor. Furthermore, in response to processing the object detection based on the event signal, the processor may be configured to deactivate the first sensor.

In some embodiments, after processing the object recognition based on the output from the second sensor according to the object detection, the processor may reactivate the first sensor and deactivate the second sensor.

In the above descriptions, it should be appreciated that any of the various embodiments including separate EBS and RGB sensor or single sensors capable of both EBS and RGB data may be used to implement the various systems and methods described herein.

In some embodiments, switching from EBS to RGB may be triggered based on a detected direction of motion in EBS data. For example, a predefined object recognized by a convolutional neural network or other method of detecting objects may be monitored to detect a direction of motion of the object. Depending on the detected direction of motion of the object, the sensor may be switched to RGB mode or to a high-frames-per-second ("FPS") RGB mode.

The switch of a sensor from EBS mode to RGB mode may be for a pre-determined amount of time. For example, after switching to RGB mode, the sensor may be switched back to EBS mode after a certain number of seconds or after a certain number of image frames. In some embodiments, the RGB mode may be analyzed to determine when an event has ended, at which time the sensor may be switched back to EBS mode.

Hereinbefore, embodiments of the present disclosure have been described, but the technical range of the present disclosure is not limited to the above-described embodiments, and various modifications can be made in a range not departing from the gist of the present disclosure. In addition, constituent elements in other embodiments and modification examples may be appropriately combined.

Disclosed herein is a combination EBS and RGB camera capable of utilizing advantages of both EBS and RGB modes. A sensor as described herein normally operates in a EBS mode and switches to RGB mode when an event warrants the switch. As used herein, RGB may refer to data relating to an amount of light intensity. An RGB sensor or a sensor operating in an RGB mode may be capable of or configured to detect an amount of light intensity.

As described herein, a EBS/RGB switchable sensor may be in a variety of forms. For example, in some embodiments, separate EBS and RGB sensors may be used. In such an embodiment, the separate EBS and RGB sensors may each comprise a plurality of pixels. The separate EBS and RGB sensors may be physically connected and may share a single lens.

In some embodiments, a single sensor with a mosaic of RGB and EBS pixels may be used. For example, a single sensor may comprise a grid of pixels. The grid of pixels may be a variety of non-switchable RGB pixels and EBS pixels. The pattern of pixels may be laid out in a random fashion or may be a particular pattern. In some embodiments, the EBS pixels may be in a small section of the grid of pixels or may be spread out evenly throughout the grid.

In some embodiments, a single sensor with switchable RGB and EBS pixels may be used. For example, a sensor may comprise a grid of pixels. Each pixel may be capable of detecting both EBS and the intensity of a color. For example, a first pixel may be switchable between collecting EBS data and red color data, while a second pixel may be switchable between collecting EBS data and green color data, and a third pixel may be switchable between collecting EBS data and blue color data.

Additional embodiments may include other combinations of switchable and non-switchable pixels and/or other color mosaic patterns.

As described herein, a EBS/RGB switchable sensor may be used in one or both of a EBS mode and an RGB mode. EBS sensors are advantageous in that EBS sensors are capable of capturing event data at high rates. EBS sensors also consume relatively lower power than RGB sensors.

In addition, the effects in the embodiments described in this specification are illustrative only, and other effect may exist without a limitation.

Furthermore, the present technology can include the following configurations:

(1)
An object recognition system comprising:
a first sensor configured to detect a change of an amount of light intensity;
a second sensor configured to detect an amount of light intensity; and
a processor configured to:
process an output from the first sensor and output an event signal,
process an object detection based on the event signal, and
process an object recognition based on an output from the second sensor according to the object detection.

(2)
The object recognition system of (1), wherein in response to processing the object detection based on the event signal, the processor activates the second sensor.

(3)
The object recognition system of (2), wherein in response to processing the object detection based on the event signal, the processor deactivates the first sensor.

(4)
The object recognition system of (3), wherein after processing the object recognition based on the output from the second sensor according to the object detection, the processor reactivates the first sensor and deactivates the second sensor.

(5)
The object recognition system of (1), wherein processing the object detection based on the event signal comprises detecting an object in the output.

(6)
The object recognition system of (5), wherein processing the object recognition based on the output from the second sensor according to the object detection comprises recognizing the object.

(7)
The object recognition system of (1), wherein processing the object recognition based on the output from the second sensor according to the object detection comprising recognizing a face.

(8)
An imaging system, comprising:
a first sensor configured to detect a change of an amount of light intensity; and
a second sensor configured to detect an amount of light intensity, wherein an output from the first sensor is processed by a processor to output an event signal, a first object is detected by the processor based on the event signal, and an object recognition is processed by the processor based on an output from the second sensor according to the object detection.

(9)
The imaging system of (8), wherein in response to processing the object detection based on the event signal, the processor activates the second sensor.

(10)
The imaging system of (9), wherein in response to processing the object detection based on the event signal, the processor deactivates the first sensor.

(11)
The imaging system of (10), wherein after processing the object recognition based on the output from the second sensor according to the object detection, the processor reactivates the first sensor and deactivates the second sensor.

(12)
The imaging system of (8), wherein processing the object detection based on the event signal comprises detecting an object in the output.

(13)
The imaging system of (12), wherein processing the object recognition based on the output from the second sensor according to the object detection comprises recognizing the object.

(14)
The imaging system of (8), wherein processing the object recognition based on the output from the second sensor according to the object detection comprising recognizing a face.

(15)
A method of implementing object recognition, the method comprising performing functions as follows with a processor:
processing an output from a first sensor configured to detect a change of an amount of light intensity;
outputting an event signal based on the output from the first sensor,
processing an object detection based on the event signal, and
processing an object recognition according to the object detection based on an output from a second sensor configured to detect an amount of light intensity.

(16)
The method of (15), wherein in response to processing the object detection based on the event signal, the processor activates the second sensor.

(17)
The method of (16), wherein in response to processing the object detection based on the event signal, the processor deactivates the first sensor.

(18)
The method of (17), wherein after processing the object recognition based on the output from the second sensor according to the object detection, the processor reactivates the first sensor and deactivates the second sensor.

(19)
The method of (15), wherein processing the object detection based on the event signal comprises detecting an object in the output.

(20)
The method of (19), wherein processing the object recognition based on the output from the second sensor according to the object detection comprises recognizing the object.

What is claimed is:

1. An object recognition system, comprising:
a first sensor configured to output first data associated with a change of an amount of light intensity to a first output circuit;
a second sensor configured to output second data associated with an amount of light intensity to a second output circuit;
a first neural network configured to detect an object in the first data;
a second neural network configured to generate a recognition of the object based on the second data;
a processor; and
a logic system, wherein in response to the first neural network detecting the object:
the processor deactivates the first sensor, activates the second sensor, and activates the logic system,
the logic system enables a second neural network to receive the second data from the second output circuit, and
the second neural network generates the recognition of the object.

2. The object recognition system of claim 1, wherein the logic system comprises a transistor controlled by an output of the first neural network.

3. The object recognition system of claim 2, wherein generating the recognition of the object comprises outputting identifying information relating to the recognition of the object.

4. The object recognition system of claim 1, wherein generating the recognition of the object comprises recognizing a face.

5. The object recognition system of claim 1, wherein the processor deactivates the second sensor after a pre-determined amount of time.

6. The object recognition system of claim 1, wherein the processor deactivates the second sensor after the second neural network generates the recognition of the object.

7. The object recognition system of claim 1, wherein the first neural network controls a frame rate of the second sensor.

8. An imaging system, comprising:
a first sensor configured to output first data associated with a change of an amount of light intensity to a first output circuit; and
a second sensor configured to output second data associated with an amount of light intensity to a second output circuit;
a first neural network configured to detect an object in the first data;
a second neural network configured to generate a recognition of the object based on the second data;
a processor; and
a logic system, wherein in response to the first neural network detecting the object:
the processor deactivates the first sensor, activates the second sensor, and activates the logic system,
the logic system enables a second neural network to receive the second data from the second output circuit, and
the second neural network generates the recognition of the object.

9. The imaging system of claim 8, wherein the logic system comprises a transistor controlled by an output of the first neural network.

10. The imaging system of claim 9, wherein generating the recognition of the object comprises outputting identifying information relating to the recognition of the object.

11. The imaging system of claim 8, wherein generating the recognition of the object comprises recognizing a face.

12. The imaging system of claim 8, wherein the processor deactivates the second sensor after a pre-determined amount of time.

13. The imaging system of claim 8, wherein the processor deactivates the second sensor after the second neural network generates the recognition of the object.

14. The imaging system of claim 8, wherein the first neural network controls a frame rate of the second sensor.

15. A method of implementing object recognition, the method comprising performing functions as follows with a processor:
processing first data output from a first sensor, the first data associated with a change of an amount of light intensity;
detecting, with a first neural network, an object in the first data; and
in response to detecting the object with the first neural network:

deactivating the first sensor;

activating a second sensor configured to output data associated with an amount of light intensity in response to the first neural network detecting the object in the first data; and activating a logic system to enable a second neural network to receive second data from the second sensor, wherein in response to the detection of the object:

the second neural network generates a recognition of the object based on the second data.

16. The method of claim 15, wherein the logic system comprises a transistor controlled by an output of the first neural network.

17. The method of claim 16, wherein generating the recognition of the object comprises outputting identifying information relating to the recognition of the object.

18. The method of claim 15, wherein the processor deactivates the second sensor after a pre-determined amount of time.

19. The method of claim 15, wherein the processor deactivates the second sensor after the second neural network generates the recognition of the object.

20. The method of claim 15, wherein the first neural network controls a frame rate of the second sensor.

* * * * *